United States Patent
Iida et al.

(10) Patent No.: US 8,972,660 B2
(45) Date of Patent: Mar. 3, 2015

(54) DISK SUBSYSTEM AND DATA RESTORATION METHOD

(75) Inventors: Junichi Iida, Odawara (JP); Naoki Moritoki, Ooi (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 13/517,423

(22) PCT Filed: Jun. 11, 2012

(86) PCT No.: PCT/JP2012/003801
§ 371 (c)(1),
(2), (4) Date: Jun. 20, 2012

(87) PCT Pub. No.: WO2013/186807
PCT Pub. Date: Dec. 19, 2013

(65) Prior Publication Data
US 2013/0332651 A1    Dec. 12, 2013

(51) Int. Cl.
*G06F 1/24* (2006.01)
*G06F 1/30* (2006.01)

(52) U.S. Cl.
USPC .......................................... 711/118; 711/120

(58) Field of Classification Search
CPC .......... G06F 17/30067; G06F 11/1076; G06F 11/2097; G06F 2211/1028; G06F 11/1471; G06F 11/0727; G06F 11/0751; G06F 11/0766; G06F 1/3221; G06F 3/0619
See application file for complete search history.

(56) References Cited

U.S. PATENT DOCUMENTS

| 5,437,022 A | 7/1995 | Beardsley et al. |
| 6,792,511 B2* | 9/2004 | Hameed ........................ 711/135 |
| 7,302,541 B2* | 11/2007 | Hirezaki et al. .............. 711/165 |
| 8,286,028 B2* | 10/2012 | Matsuda et al. ............. 714/6.24 |
| 8,327,069 B2* | 12/2012 | Moritoki ....................... 711/119 |
| 2003/0221070 A1 | 11/2003 | Minowa et al. |
| 2004/0034745 A1 | 2/2004 | Hameed |
| 2006/0212644 A1* | 9/2006 | Acton et al. .................. 711/103 |
| 2009/0055590 A1 | 2/2009 | Takahashi |
| 2011/0208998 A1 | 8/2011 | Hosaka |

FOREIGN PATENT DOCUMENTS

| JP | 6-222988 A | 8/1994 |
| JP | 2009-048544 A | 3/2009 |
| WO | 2011/070611 A1 | 6/2011 |

\* cited by examiner

*Primary Examiner* — Matthew Bradley
*Assistant Examiner* — Candice Rankin
(74) *Attorney, Agent, or Firm* — Volpe and Koenig, P.C.

(57) ABSTRACT

A disk subsystem and a data restoration method with which the rise time when the disk subsystem is restored can be shortened.
A disk subsystem and data restoration method whereby, when the power of the disk subsystem is shut off, the shared memory management table is saved to non-volatile memory together with the cache data and, when the power of the disk subsystem is restored, the shared memory management table is referenced and the duplex data is assigned by two non-volatile memories and restored to each of two shared memories.

14 Claims, 17 Drawing Sheets

| HOST ADDRESS | CACHE ADDRESS CL1 | CACHE ADDRESS CL2 |
|---|---|---|
| ... | ... | ... |
| AAA | XXX | ZZZ |
| ... | ... | ... |
| BBB | YYY | 0 |

T11 — T12 — T13

T1(CL2)

| HOST ADDRESS | CACHE ADDRESS CL1 | CACHE ADDRESS CL2 |
|---|---|---|
| CCC | 0 | WWW |
| ... | ... | ... |
| AAA | XXX | ZZZ |
| ... | ... | ... |

| CL1 | CL2 | ORDER RANKING |
|---|---|---|
| MEMORY00 | MEMORY10 | 1 |
| MEMORY00 | MEMORY11 | 2 |
| MEMORY01 | MEMORY10 | 3 |
| MEMORY01 | MEMORY11 | 4 |

T21  T22  T23

T2(CL2)

| CL1 | CL2 | ORDER RANKING |
|---|---|---|
| MEMORY00 | MEMORY10 | 4 |
| MEMORY00 | MEMORY11 | 3 |
| MEMORY01 | MEMORY10 | 2 |
| MEMORY01 | MEMORY11 | 1 |

T21  T22  T23

DISK SUBSYSTEM AND DATA RESTORATION METHOD

TECHNICAL FIELD

The present invention relates to a disk subsystem and a data restoration method and, more particularly, is suitably applied to a disk subsystem and a data restoration method with which data which is stored in a volatile memory is saved to a non-volatile memory when power is shut off and with which data which has been saved to a non-volatile memory is restored to a volatile memory when the power is restored.

BACKGROUND ART

Conventionally, a disk subsystem exists with which the difference between the speed of data transfer from a host apparatus and a storage apparatus read speed is absorbed by inserting a cache memory which is a volatile memory in the data flow between the host apparatus and the storage apparatus.

Typically, a disk subsystem is configured comprising a disk controller which is connected to a host apparatus which is a host system, and a storage apparatus for storing data. Further, the disk controller is configured comprising a processor, a memory controller, and a cache memory and the like.

When data is written, upon receipt of data from the host apparatus, the processor writes the received data to the cache memory and transmits a write completion notification (ACK) to the host apparatus by way of co-operation with the memory controller. Thereafter, the processor transfers the data which has been written to the cache memory to a storage apparatus asynchronously to an I/O from the host apparatus. Note that processing to transfer data from the disk controller to the storage apparatus is called de-staging.

Furthermore, when data is read, the processor reads data which is requested by the host apparatus from the storage apparatus and writes the read data to the cache memory by way of co-operation with the memory controller. Note that, here, the processing to write the data to the cache memory of the disk controller serves to expedite the process by re-using the data. Thereafter, the processor transfers the data which has been written to the cache memory to the host apparatus.

Here, upon receiving the ACK from the disk controller, the host apparatus determines that the data has been written to the storage apparatus without problems and deletes the data from the memory in the host apparatus. However, in reality, the transfer of data from the cache memory in the disk controller to the storage apparatus has not yet been completed and if the power of the disk subsystem is shut off for any reason during this period, the data which has been written to the cache memory is lost and restoration becomes problematic.

Therefore, as one measure for preserving the data which is written to the cache memory, there exists a method of saving data to the non-volatile memory. The method of saving data to the non-volatile memory is a method whereby data which has been written to the cache memory which is volatile memory is saved to the non-volatile memory when the power is shut off and the data which has been saved to the non-volatile memory is restored to the cache memory when the power is restored. Note that processing for restoration from the non-volatile memory to the cache memory is called de-staging. As a result of this method, it is possible to prevent any loss of the data which has not been written to the storage apparatus simply by writing this data to the cache memory when the power is shut off.

PTL1 discloses a disk subsystem with a redundant configuration in which redundancy is established by disposing controllers in the disk controller on two channels. More specifically, a disk subsystem is disclosed in which each of the controllers on the two channels is provided with a cache memory and a non-volatile memory, duplex data is stored in each cache memory and which exercises control such that, when the power is shut off, the data in each cache memory is saved to each non-volatile memory.

PTL2 discloses a disk subsystem which exercises control such that, in a plurality of DKC (DisK Controller) modules which comprise a cache memory and an SSD (Solid State Drive) which is a non-volatile memory, data in the cache memory of a first DKC module which is the master is copied into the cache memory of a second DKC module which is the slave. More specifically, when the power is shut off, data in the cache memory of the second DKC module is backed up to the SSD of the second DKC module, and only copy data in the cache memory of the first DKC module is backed up to the SSD of the first DKC module. Furthermore, a disk subsystem is disclosed whereby, when the power is restored, the data which has been backed up to the SSD of both the first and second DKC modules is used to restore data to the cache memory of the first DKC module.

CITATION LIST

Patent Literature

PTL 1: Japanese Unexamined Patent Application Publication No. H6-222988
PTL 2: Japanese Unexamined Patent Application Publication No. 2009-048544

SUMMARY OF INVENTION

Technical Problem

However, in the case of the disk subsystems disclosed in PTL1 and PTL2, when a situation is considered where the SSD performance is low in comparison with another device such as a cache memory, it takes a long time until the restore is complete. It also takes a long time until the restore is complete because cache memory capacities have increased in recent years. As a result, there is a problem in that there is an increase in the rise time when the disk subsystem is restored.

The present invention was conceived in view of the above points, and proposes a disk subsystem and a data restoration method with which the rise time when a disk subsystem is restored can be shortened.

Solution to Problem

In order to achieve the foregoing object, the present invention comprises a first cache board, a second cache board, and a transmission channel which communicably connects the first cache board and the second cache board, wherein, if power is shut off, the first processor saves data which is stored in the first volatile memory to the first non-volatile memory and saves first management information to the first non-volatile memory, wherein, if power is restored, the first processor restores first data which has been saved to the first non-volatile memory and second data which has been transferred via the transmission channel to the first volatile memory on the basis of the first management information and transfers the first data to the second cache board via the transmission channel, wherein, if power is shut off, the second processor saves data which is stored in a second volatile memory to a second non-volatile memory and saves second management information to the second non-volatile memory, and wherein, if power is restored, the second processor restores the second data which has been saved to the second non-volatile memory and the first data which has been transferred via the transmission channel to a second volatile memory on the basis of the second management information and transfers the second data to the first cache board via the transmission channel.

In order to achieve the foregoing object, the present invention provides a data restoration method for a disk subsystem, wherein the disk subsystem comprises a first cache board, a second cache board, and a transmission channel which communicably connects the first cache board and the second cache board, the data restoration method comprising a first step in which, if power is shut off, the first processor saves data which is stored in a first volatile memory to a first non-volatile memory and saves first management information to the first non-volatile memory; a second step in which, if power is restored, the first processor restores first data which has been saved to the first non-volatile memory and second data which has been transferred via the transmission channel to the first volatile memory on the basis of the first management information and transfers the first data to the second cache board via the transmission channel; a third step in which, if power is shut off, the second processor saves data which is stored in a second volatile memory to a second non-volatile memory and saves second management information to the second non-volatile memory; and a fourth step in which, if power is restored, the second processor restores second data which has been saved to the second non-volatile memory and first data which has been transferred via the transmission channel to the second volatile memory on the basis of the second management information and transfers the second data to the first cache board via the transmission channel.

Advantageous Effects of Invention

With the present invention, the rise time when a disk subsystem is restored can be shortened.

BRIEF DESCRIPTION OF DRAWINGS

FIG. 3 is a conceptual diagram showing a shared memory management table.
FIG. 15 is a conceptual diagram showing a conflict avoidance rule table.

DESCRIPTION OF EMBODIMENTS

An embodiment of the present invention will be described in detail hereinbelow with reference to the drawings.

(1) First Embodiment (1-1) Configuration of Disk Subsystem

Figure 1:
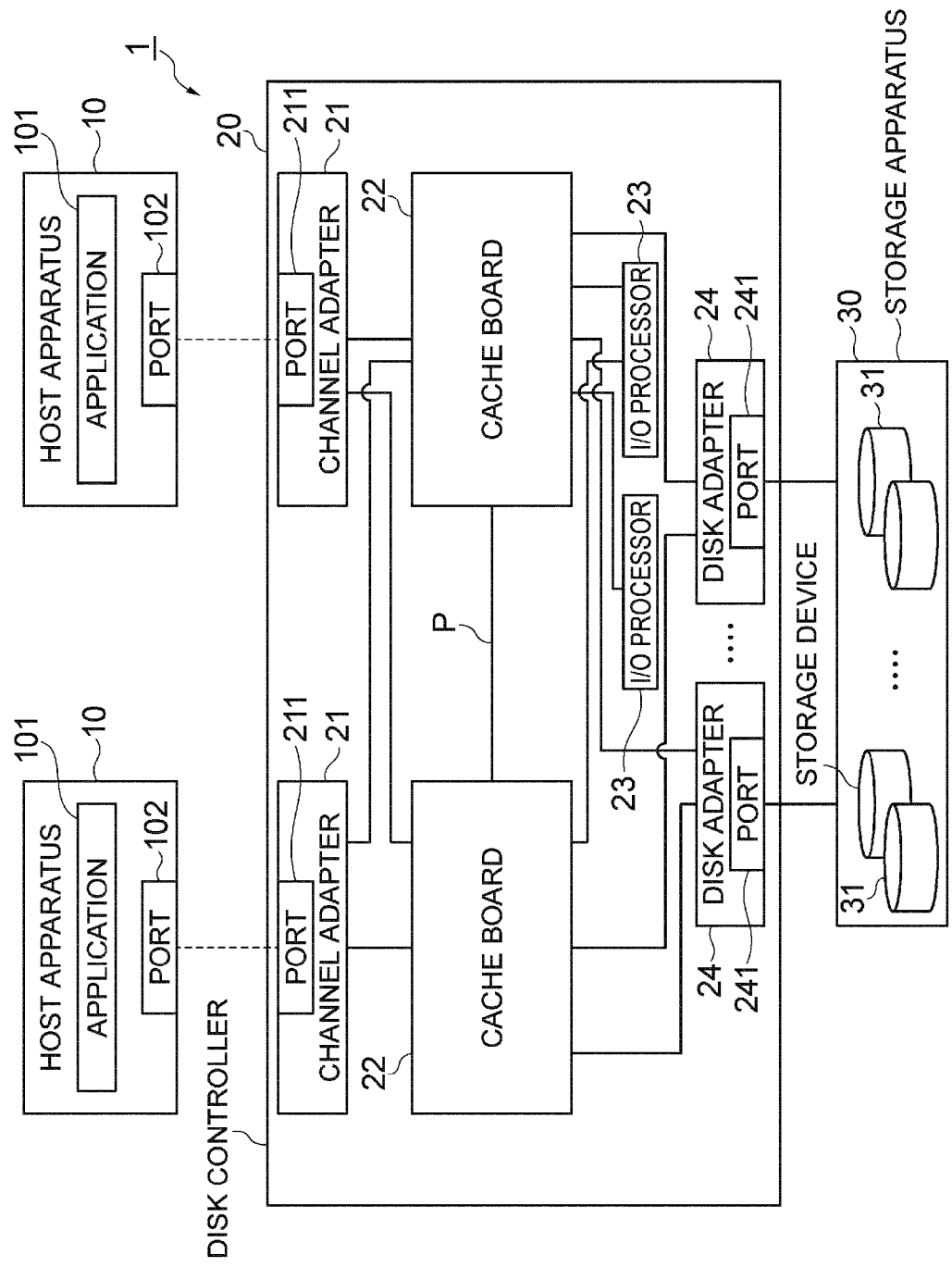
FIG. 1 is a conceptual diagram showing an overall configuration of a disk subsystem.

FIG. 1 shows the overall configuration of a disk subsystem 1. The disk subsystem 1 is connected to a host apparatus 10 and is configured comprising a disk controller 20 and a storage apparatus 30.

The host apparatus 10 is configured comprising an application 101 and a port 102.

The application 101 is a software program for performing data creation and editing required for a task. Further, the port 102 is an interface for connecting to the disk controller 20.

The host apparatus 10 transmits an I/O request to the disk controller 20 by means of the application 101 and the port 102.

The disk controller 20 is configured comprising two channel adapters 21, two cache boards 22, two I/O processors 23, and two disk adapters 24. Further, the cache boards 22 are interconnected by means of a dedicated path P. The disk controller 20 executes various processing so that, by means of clustering, the two channel adapters 21, two cache boards 22, two I/O processors 23, and two disk adapters 24 are each viewed collectively as a single device by the host apparatus 10.

Note that, in this embodiment, if a distinction is to be made, in the description, between each of the two sets of devices, the channel adapter 21 which is disposed on the left is called the channel adapter 21 (CL1) and the channel adapter which is disposed on the right is called the channel adapter 21 (CL2), for example, whereas if no particular distinction is to be made and a configuration is described in which there is no function which both adapters comprise, the channel adapters are referred to as the channel adapters 21. The same is also true of the other configurations.

The channel adapter 21 is configured comprising a port 211. The port 211 is an interface for connecting to the host apparatus 10. Further, the cache board 22 is a board for temporarily saving data which is to be written to the storage apparatus 30 and which has been sent from the host apparatus 10 (write data) and data which is to be read by the host apparatus 10 and which has been sent from the storage apparatus 30 (read data).

In this embodiment, the cache boards 22 are communicably interconnected by means of a dedicated path P called PCI Express, for example.

Further, the I/O processor 23 is a processor which receives I/O requests from the host apparatus 10 and executes I/O processing. The disk adapter 24 is configured comprising a port 241. The port 241 is an interface for connecting to the storage apparatus 30.

The storage apparatus 30 is configured comprising a plurality of storage devices 31. The storage devices 31 are high-cost SCSI (Small Computer System Interface) disks or low-cost SATA (Serial AT Attachment) disks, for example, and are devices for long-term storage of data which is transmitted from the host apparatus.

(1-2) Cache Board Configuration

Figure 2:
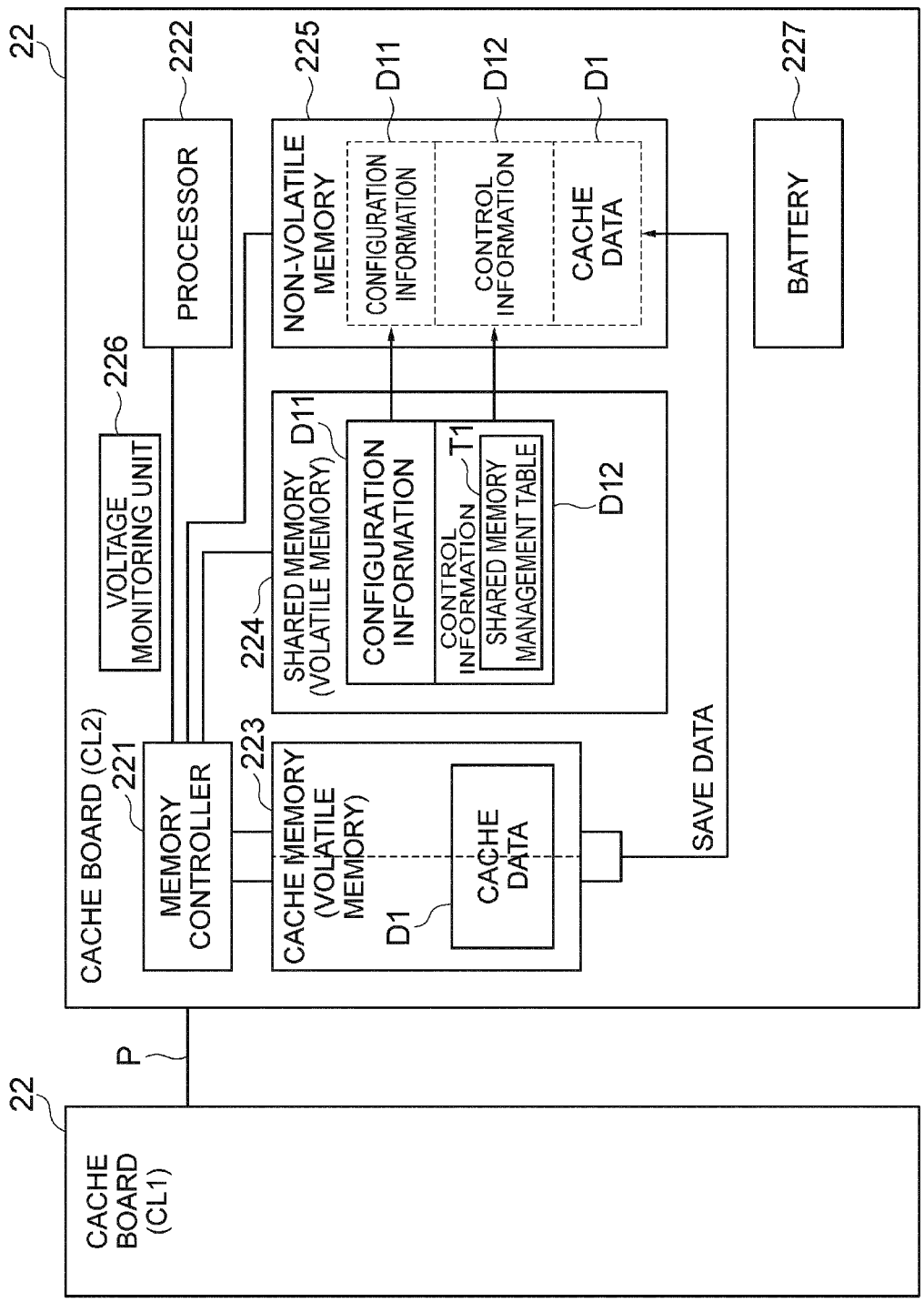
FIG. 2 is a conceptual diagram showing a functional configuration of a cache board.

FIG. 2 shows a functional configuration of the cache board 22. The cache board 22 is configured comprising a memory controller 221, a processor 222, a cache memory 223, a shared memory 224, a non-volatile memory 225, a voltage monitoring unit 226, and a battery 227.

The memory controller 221 is a controller which is connected to the cache memory 223, the shared memory 224, and the non-volatile memory 225, and so on, and which executes I/O processing for each memory. Further, the processor 222 is a processor which executes I/O processing within each memory as mentioned earlier by way of co-operation with the memory controller 221.

Further, by co-operating with the processor 222, the memory controller 221 saves cache data D1 in the non-volatile memory 225 by means of power which is supplied from the battery 227 if the power of the disk subsystem 1 is shut off for any reason.

In addition, the memory controller 221 saves configuration information D11 and control information D12 in the non-volatile memory 225 by means of power which is supplied from the battery 227 if the power of the disk subsystem 1 is shut off for any reason.

The cache memory 223 is a volatile memory in which data cannot be saved if the power of the disk subsystem 1 is shut off and is a memory module known as DIMM (Dual Inline Memory Module), for example.

Further, the cache memory 223 temporarily saves data which is written to the storage apparatus 30 and which has been sent from the host apparatus 10 and data which is read by the host apparatus 10 and which has been sent from the storage apparatus 30 by means of the I/O processing of the memory controller 221.

Furthermore, the write data and read data which are saved in the cache memory 223 are referred to here under the global term cache data D1.

The shared memory 224 is a volatile memory which is unable to save data if the power of the disk subsystem 1 is shut off and is a memory module known as DIMM, for example.

Further, the shared memory 224 temporarily saves configuration information D11 and control information D12 by means of the I/O processing of the memory controller 221.

The configuration information D11 is information for managing the configuration of the disk subsystem 1 and is, for example, information which includes assignment information indicating to which host apparatus 10 the position information of the storage device 31 and the logical volume provided by the storage device 31 are assigned.

In addition, the control information D12 is information which is used to control the operation of the disk subsystem 1 and which includes the shared memory management table T1. This shared memory management table T1 will be described subsequently (see FIG. 3).

The non-volatile memory 225 is a non-volatile memory which is able to save data even if the power of the disk subsystem 1 is shut off and is semiconductor memory known as SSD (Solid State Drive), for example.

Further, the non-volatile memory 225 holds the cache data D1 which is sent from the cache memory 223 and the configuration information D11 and the control information D12 which are sent from the shared memory 224 temporarily or for long periods.

The voltage monitoring unit 226 is a measuring instrument for monitoring the voltage which is supplied to the cache board 22 and outputting the monitoring result obtained by the monitoring to the processor 222. Note that the processor 222 to which the monitoring result from the voltage monitoring unit 226 is input is able to determine whether or not power is being suitably supplied to the cache board 22 and, if a voltage drop is detected, is able to switch to the power supply from the battery 227.

The battery 227 is a cell which functions as an emergency power source if the power of the disk subsystem 1 is shut off. The battery 227 supplies power to the cache board 22 until the cache data D1 has been transferred from the cache memory 223 to the non-volatile memory 225, for example.

(1-3) Table Configuration

FIG. 3 shows a conceptual diagram of the shared memory management table T1. The shared memory management table T1 (CL1) is a table which is held by the left cache board 22 (CL1) in FIG. 2, and the shared memory management table T1 (CL2) is a table which is held by the right cache board 22 (CL2) in FIG. 2.

The shared memory management table T1 is a table which is referenced when the cache data D1 is assigned and restored from the non-volatile memory 225 to the cache memory 223 when the disk subsystem 1 is restored, and is configured from a host address field T11, a cache address CL1 field T12, and a cache address CL2 field T13.

The host address field T11 stores address information in the host apparatus 10 as information for specifying the position of the host apparatus 10. Further, the cache address CL1 field T12 stores address information in the cache memory 223 (CL1) where the cache data D1 is stored. Further, the cache address CL2 field T13 stores address information in the cache memory 223 (CL2) where the cache data D1 is stored.

Therefore, in the case of FIG. 3, for example, the write data from the host apparatus 10 with the host address "AAA" is stored in the cache memory 223 (CL1) in a storage area with an address "XXX" and is stored in the cache memory 223 (CL2) in a storage area with an address "ZZZ."

(1-4) Data Configuration

Figure 4:
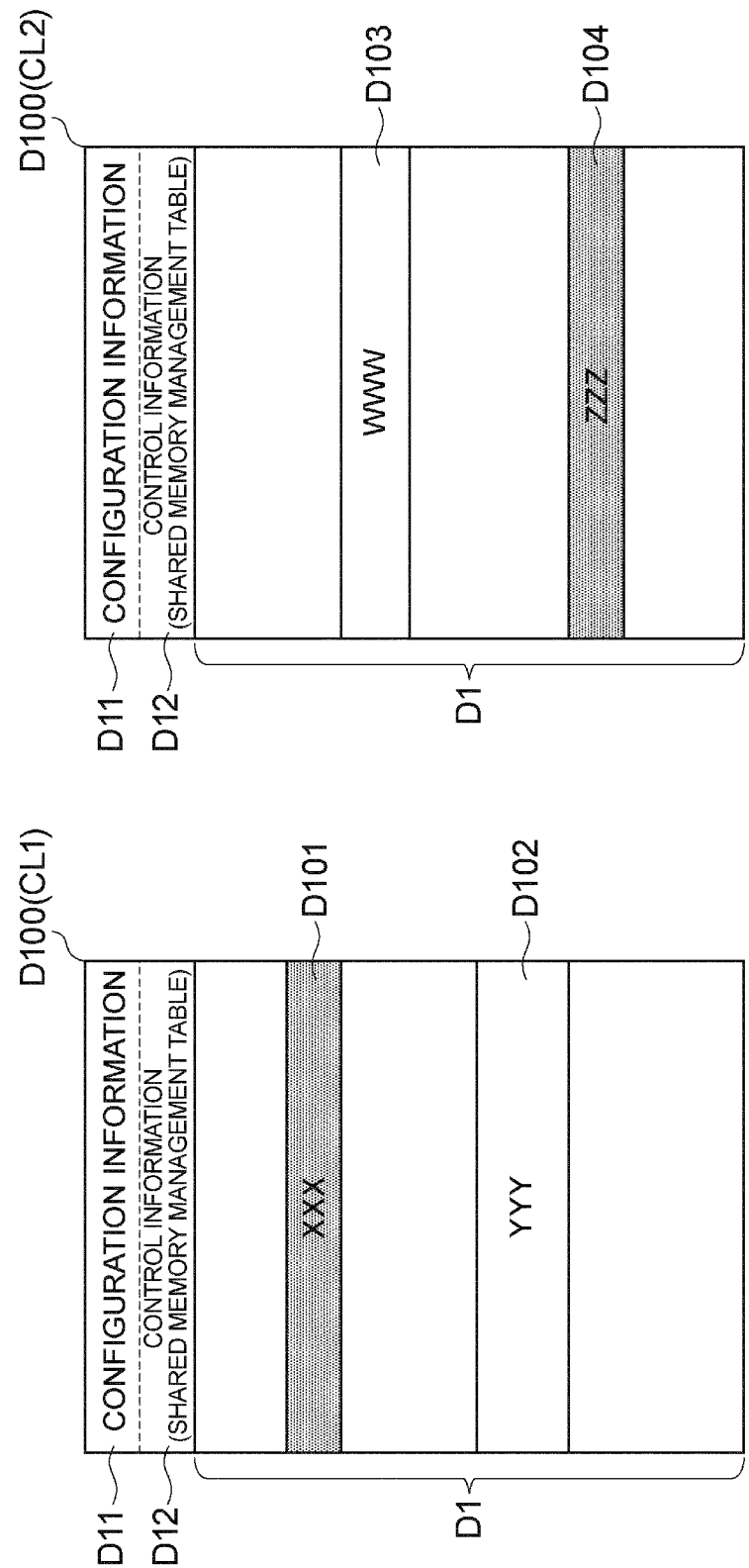
FIG. 4 is a conceptual diagram showing a data configuration of restore data.

FIG. 4 shows a conceptual diagram of the data configuration of restore data D100 which is held by the non-volatile memory 225. The restore data D100 (CL1) is data which is held by the left cache board 22 (CL1) in FIG. 2 and the restore data D100 (CL2) is data which is held by the right cache board 22 (CL2) in FIG. 2.

The restore data D100 is data which is restored from the non-volatile memory 225 to the cache memory 223 or the shared memory 224 when the disk subsystem 1 is restored and is configured from the configuration information D11, the control information D12, and the cache data D1.

The configuration information D11 and the control information D12 is data which is restored from the non-volatile memory 225 to the shared memory 224 when the disk subsystem 1 is restored.

The cache data D1 is data which is restored from the non-volatile memory 225 to the cache memory 223 when the disk subsystem 1 is restored.

Further, among the cache data D1 (CL1), data D101 which is stored in a position with the address "XXX" in the cache memory 223 (CL1) is, in referencing FIG. 3, the same as data D104 which is stored at an address "ZZZ" in the cache memory 223 (CL2), and hence the same data, which is stored in both the cache memory 223 (CL1) and the cache memory 223 (CL2) is referred to here as duplex data. Typically, write data from the host apparatus 10 to the storage apparatus 30 is held in duplicate in the cache memory 223 in both the cache memory 223 (CL1) and the cache memory 223 (CL2).

Furthermore, among the cache data D1 (CL1), regarding data D102 which is stored in a position with the address "YYY" in the cache memory 223 (CL1), in referencing FIG. 3, corresponding data is not stored in any address in the cache memory 223 (CL2), and the data which is stored in only one cache memory 223 is referred to here as duplex data. Typically, the data which is read from the storage apparatus 30 to the host apparatus 10 is data which has already been stored in the storage apparatus 30 and not duplicated, and is held is either cache memory 223.

(1-5) Update Image of Shared Memory Management Table

Figure 5:
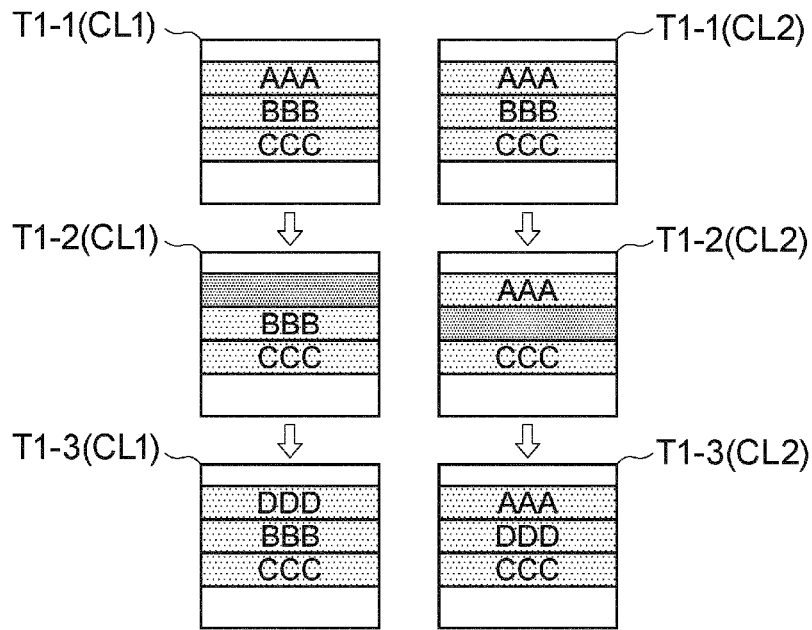
FIG. 5 is a conceptual diagram showing an update image of a shared memory management table during writing.

FIG. 5 shows an update image in the shared memory management table T1 in a case where write processing from the host apparatus 10 to the storage apparatus 30 is executed. Note that, here, because the management state of the shared memory management table T1 is described in chronological order, and hence the shared memory management table T1 is described as shared memory management tables T1-1, T1-2, and T1-3 in chronological order.

In the shared memory management table T1-1 (CL1) and the shared memory management table T1-1 (CL2), it can be seen that "AAA", "BBB", and "CCC" are managed as address information in the cache memory 223 where cache data D1 is currently stored. In a case where a write request from the host apparatus 10 to the storage apparatus 30 is transmitted to the disk controller 20, the shared memory management table T1 is updated from the shared memory management table T1-1 to the shared memory management table T1-2.

In the case of the shared memory management table T1-2 (CL1) and the shared memory management table T1-2 (CL2), shared memory management tables T1 after the write request from the host apparatus 10 to the storage apparatus 30 has been transmitted to the disk controller 20 can be seen. In the shared memory management table T1-2 (CL1) and the shared memory management table T1-2 (CL2), it can be seen that the storage address of data which is old among the cache data D1 and which has been deleted from the cache memory 223 is released in preparation for storing new write data in the cache memory 223. Here, it can be seen that the address "AAA" is released among the addresses in the cache memory 223 (CL1) and the address "BBB" is released among the addresses in the cache memory 223 (CL2). Note that since write data is in duplicate, the data is stored at both of the respective cache addresses thus released.

In the case of the shared memory management table T1-3 (CL1) and the shared memory management table T1-3 (CL2), shared memory management tables T1 after the write data has been stored in the cache memory 223 in response to a write request from the host apparatus 10 to the storage apparatus 30 are shown. In the shared memory management table T1-3 (CL1) and the shared memory management table T1-3 (CL2), it can be seen that new write data is stored at the address "DDD" among the addresses in the cache memory 223 (CL1) and stored at the address "DDD" among the addresses in the cache memory 223 (CL2).

Figure 6:
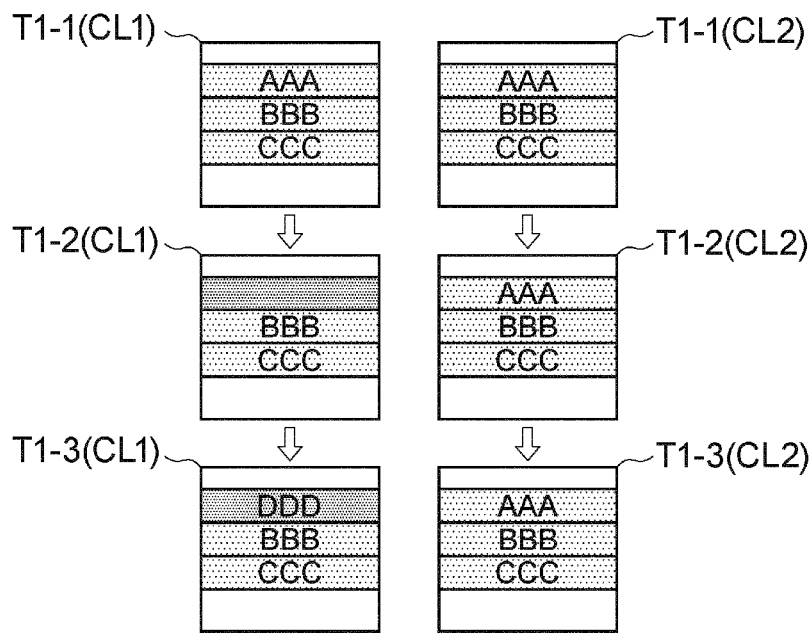
FIG. 6 is a conceptual diagram showing an update image of a shared memory management table during reading.

FIG. 6 shows an update image in the shared memory management table T1 in a case where processing to read from the storage apparatus 30 to the host apparatus 10 is executed. Note that here also, since the management state of the shared memory management table T1 is described in chronological order, the shared memory management tables T1 are described in chronological order as shared memory management tables T1-1, T1-2, and T1-3.

In the shared memory management table T1-1 (CL1) and the shared memory management table T1-1 (CL2), it can be seen that "AAA," "BBB," and "CCC" are managed as address information in the cache memory 223 where the cache data D1 is currently stored. If a read request from the host apparatus 10 to the storage apparatus 30 is transmitted to the disk controller 20, the shared memory management table T1 is updated from the shared memory management table T1-1 to the shared memory management table T1-2.

In the case of the shared memory management table T1-2 (CL1) and the shared memory management table T1-2 (CL2), shared memory management tables T1 after a read request from the host apparatus 10 to the storage apparatus 30 has been transmitted to the disk controller 20 are shown. In the shared memory management table T1-2 (CL1), it can be seen that the storage address of data which is old among the cache data D1 and which has been deleted from the cache memory 223 is released in preparation for storing the read data in the cache memory 223 (CL1). Here, it can be seen that the address "AAA" is released among the addresses in the cache memory 223 (CL1). Note that since the read data is duplex data, the data is not stored in the cache memory 223 (CL2). Accordingly, the shared memory management table T1 (CL2) is not modified here.

In the case of the shared memory management table T1-3 (CL1), a shared memory management table T1 after the read data has been stored in the cache memory 223 (CL1) in response to a read request from the host apparatus 10 to the storage apparatus 30 is shown. In the shared memory management table T1-3 (CL1), it can be seen that the read data is stored at the address "DDD" among the addresses in the cache memory 223 (CL1).

(1-6) Store and Restore Image

Figure 7:
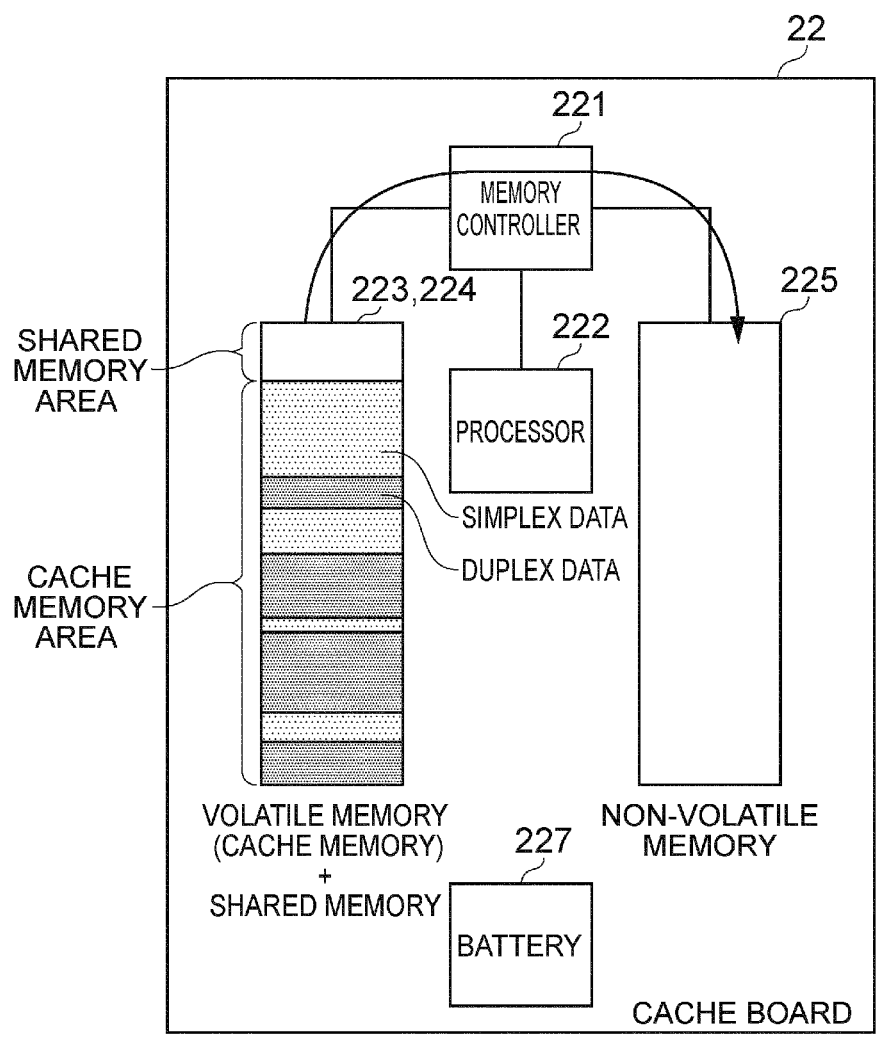
FIG. 7 is a conceptual diagram showing a restore image when power is shut off.

FIG. 7 shows a store image when the power is shut off. In a case where the power of the disk subsystem 1 is shut off for any reason, the power is supplied by the battery 227. The memory controller 221 saves the data which is stored in the cache memory 223 and the shared memory 224 which are volatile memory in the non-volatile memory 225 by co-operating with the processor 222.

Saved data includes the cache data D1 which is stored in the cache memory 223 and the configuration information D11 and the control information D12 which are stored in the shared memory 224. The cache data D1 randomly contains, as illustrated in FIG. 7, duplex data which is write data and simplex data which is read data. Further, the control information D12 includes the shared memory management table T1.

Figure 8:
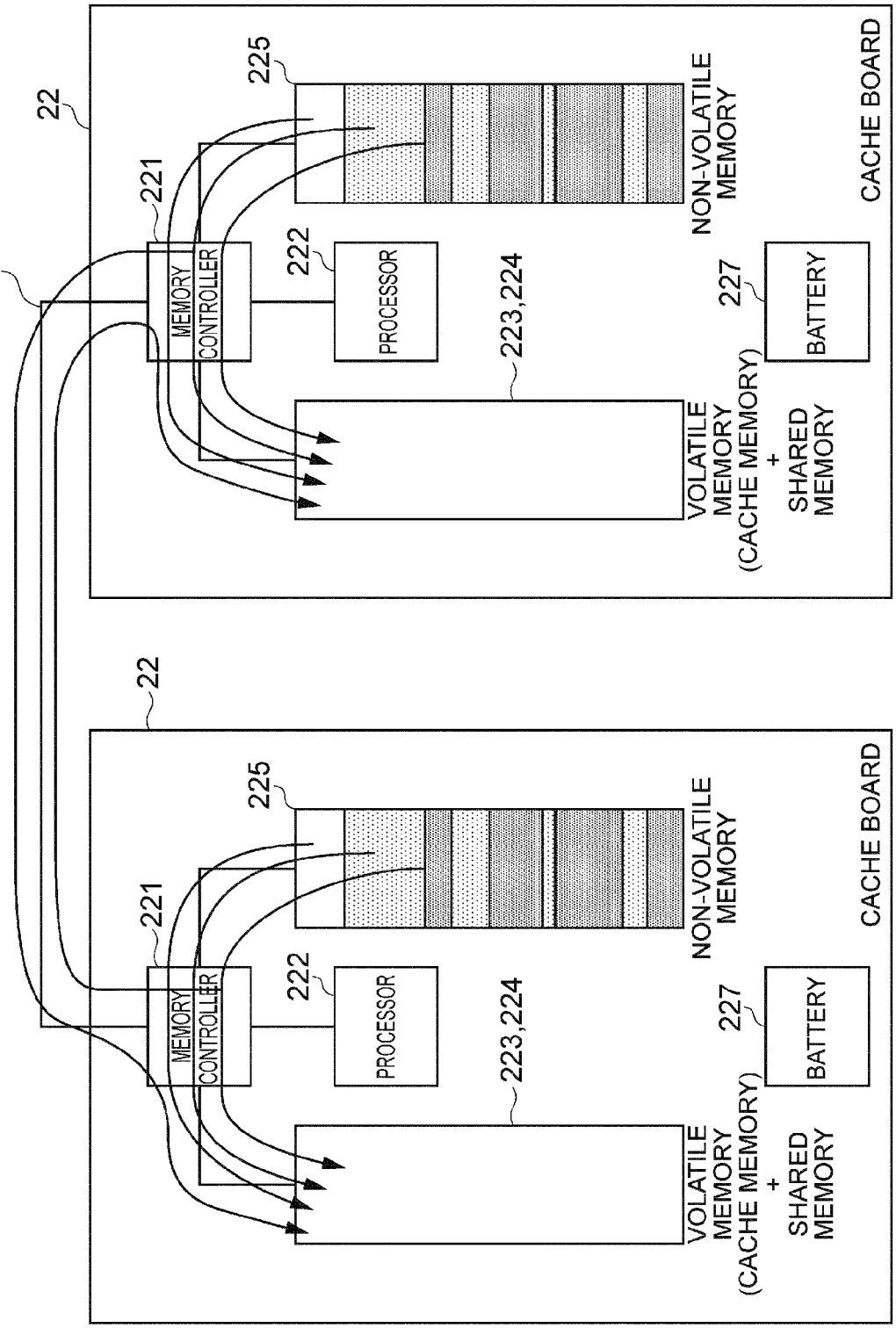
FIG. 8 is a conceptual diagram showing a restore image when power is restored.

FIG. 8 shows a restore image when power is restored. If the power of the disk subsystem 1 is restored, the memory controller 221 restores the data which has been saved to the non-volatile memory 225 to the cache memory 223 or the shared memory 224 which are volatile memory by co-operating with the processor 222.

The data which was restored to the shared memory 224 is specifically the configuration information D11 and the control information D12 and is restored in the same cache board 22. For example, the shared memory management table T1

(CL1) which is contained in the control information D12 (CL1) is restored from the non-volatile memory 225 (CL1) to the shared memory 224 (CL1). Meanwhile, the shared memory management table T1 (CL2) is restored from the non-volatile memory 225 (CL2) to the shared memory 224 (CL2).

Further, the data which is restored to the cache memory 223 is specifically simplex data and duplex data, with the simplex data being restored in the same cache board 22 and the duplex data being restored within the same cache board 22 or between cache boards 22 via the dedicated path P. For example, the simplex data (CL1) in the cache board 22 (CL1) is restored from the non-volatile memory 225 (CL1) to the cache memory 223 (CL1). Meanwhile, the simplex data (CL2) in the cache board 22 (CL2) is restored from the non-volatile memory 225 (CL2) to the cache memory 223 (CL2).

Further, the duplex data (CL1) in the cache board 22 (CL1) is restored from the non-volatile memory 225 (CL1) to the cache memory 223 (CL1) and the cache memory 223 (CL2). Meanwhile, the duplex data (CL2) in the cache board 22 (CL2) is restored from the non-volatile memory 225 (CL2) to the cache memory 223 (CL2) and the cache memory 223 (CL1).

(1-7) Flowchart

Figure 9:
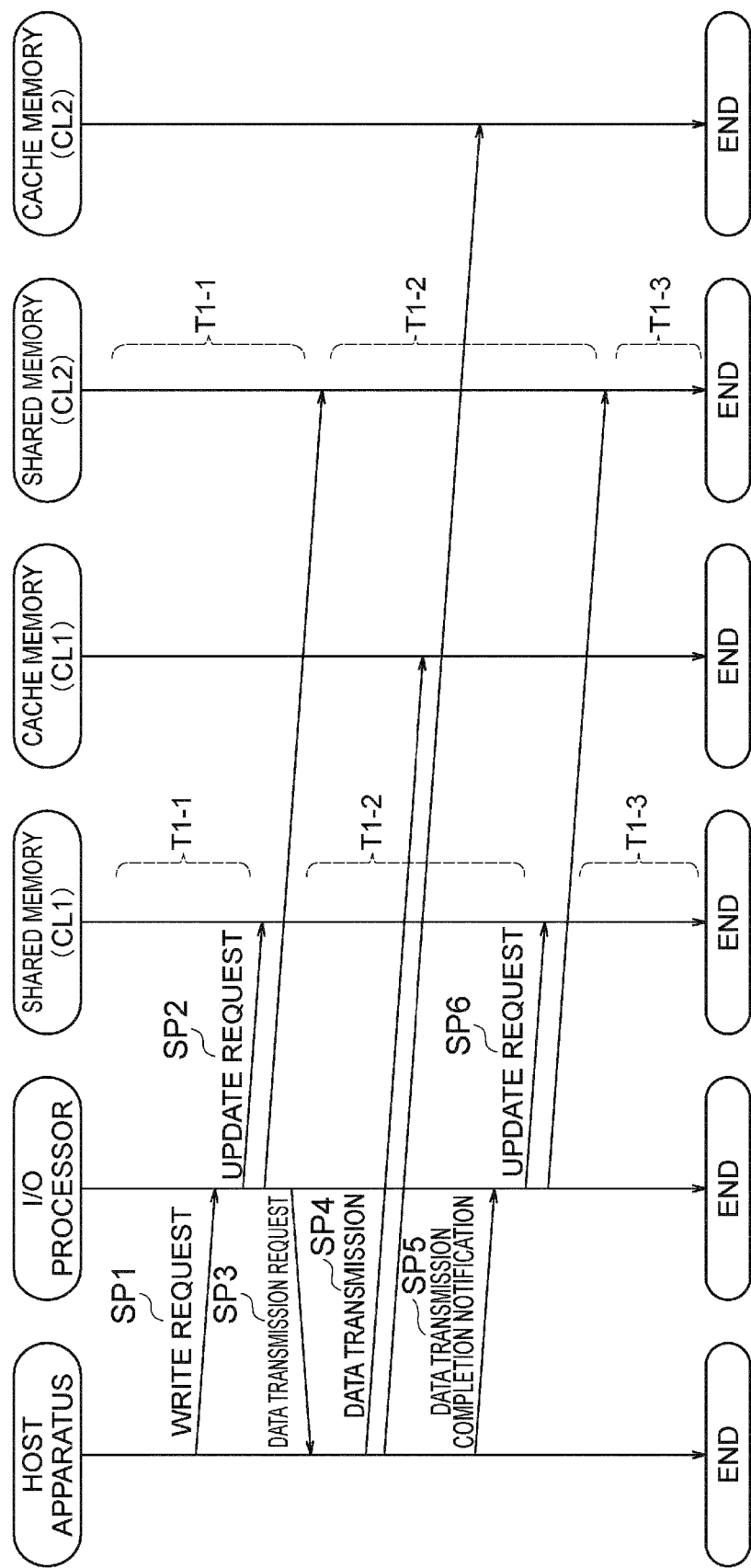
FIG. 9 is a flowchart showing write processing.

FIG. 9 shows the processing procedure for write processing. The write processing is executed when a write request transmitted from the host apparatus 10 is received by the disk controller 20. Furthermore, as a result of this write processing, the shared memory management table T1 is updated as shown in FIG. 5. T1-1, T1-2, and T1-3 in FIG. 9 correspond to T1-1, T1-2, and T1-3 in FIG. 5.

First, the host apparatus 10 transmits a request to write to the storage apparatus 30 to the disk subsystem 1 (SP1).

Upon receiving the write request from the host apparatus 10, the I/O processor 23 in the disk subsystem 1 transmits an update request requesting an update to the shared memory management table T1 to the shared memory 224 (CL1) and the shared memory 224 (CL2). Note that, in reality, the memory controller 221 receives an update request from the I/O processor 23 and the memory controller 221 updates the shared memory management table T1 by releasing any address among the addresses which are managed by the shared memory management table T1 by way of co-operation with the processor 222 (SP2).

The I/O processor 23 then transmits a data transmission request requesting transmission of write data to the host apparatus 10 (SP3).

Upon receiving the data transmission request from the I/O processor 23, the host apparatus 10 transmits the write data to the cache memory 223 (CL1) and the cache memory 223 (CL2). Note that, in reality, the memory controller 221 receives the write data from the host apparatus 10 and the memory controller 221 duplexes and stores the write data in the cache memory 223 (CL1) and the cache memory 223 (CL2) respectively by co-operating with the processor 222 (SP4).

When transmission of the write data is complete, the host apparatus 10 then transmits a data transmission completion notification to the I/O processor 23 (SP5).

Upon receiving the data transmission completion notification from the host apparatus 10, the I/O processor 23 transmits the update request requesting the update to the shared memory management table T1 to the shared memory 224 (CL1) and the shared memory 224 (CL2). Note that, in reality, the memory controller 221 receives the update request from the I/O processor 23 and the memory controller 221 updates the shared memory management table T1 by adding the newly managed address to the shared memory management table T1 by way of co-operation with the processor 222 (SP6), and ends the write processing.

Figure 10:
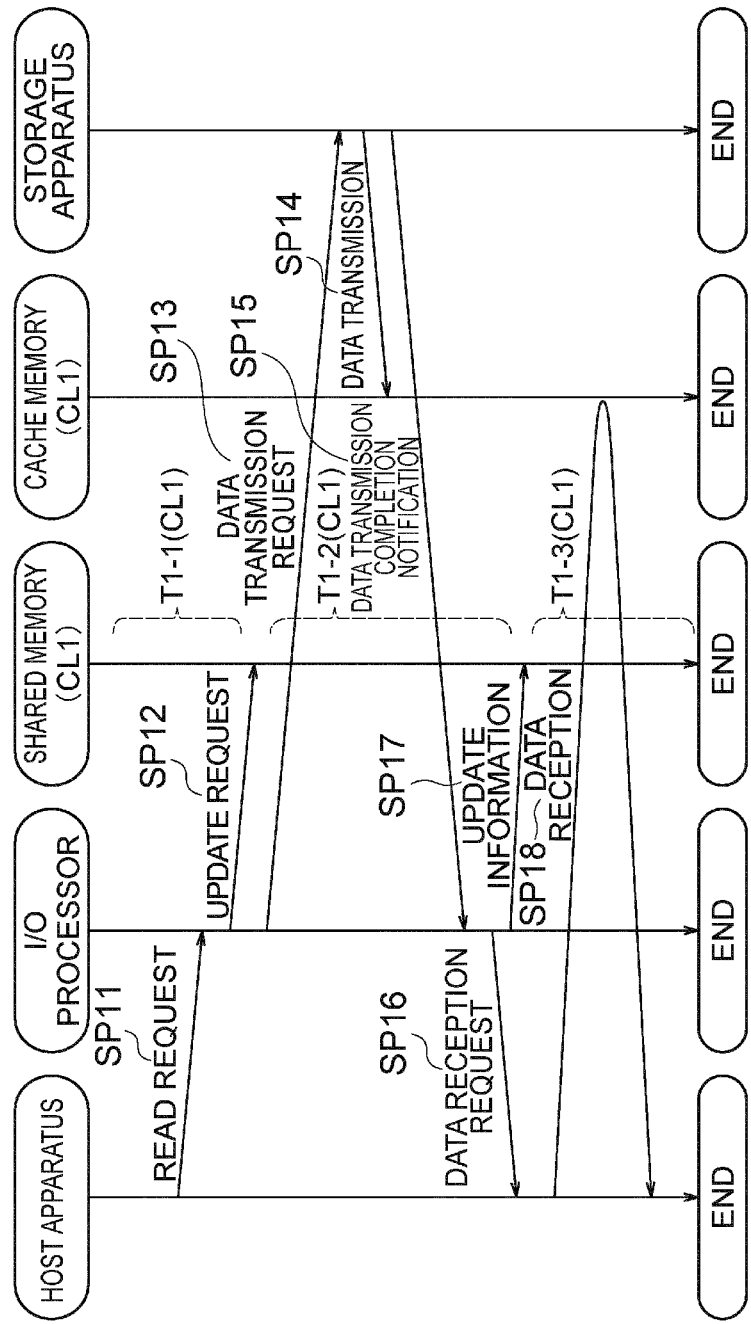
FIG. 10 is a flowchart showing read processing.

FIG. 10 shows the processing procedure for read processing. This read processing is executed when the disk controller 20 receives a read request which is transmitted from the host apparatus 10. Further, as a result of this read processing, the shared memory management table T1 is updated as shown in FIG. 6. T1-1, T1-2, T1-3 in FIG. 10 corresponds to T1-1, T1-2, and T1-3 in FIG. 6.

First, the host apparatus 10 transmits the request to read the storage apparatus 30 to the disk subsystem 1 (SP11).

Upon receiving the read request from the host apparatus 10, the I/O processor 23 in the disk subsystem 1 transmits the update request requesting an update to the shared memory management table T1 to the shared memory 224 (CL1). Note that, in reality, the memory controller 221 receives the update request from the I/O processor 23 and the memory controller 221 updates the shared memory management table T1 by releasing any address among the addresses which are managed in the shared memory management table T1 by way of co-operation with the processor 222 (SP12).

The I/O processor 23 then transmits a data transmission request requesting transmission of read data to the storage apparatus 30 (SP13).

Upon receiving a data transmission request from the I/O processor 23, the storage apparatus 30 transmits the read data to the cache memory 223 (CL1). Note that, in reality, the memory controller 221 receives the read data from the storage apparatus 30, and the memory controller 221 stores the read data in the cache memory 223 (CL1) as simplex data by way of co-operation with the processor 222 (SP14).

Upon completing the read data transmission, the storage apparatus 30 then transmits a data transmission completion notification to the I/O processor 23 (SP15).

Upon receiving the data transmission completion notification from the storage apparatus 30, the I/O processor 23 transmits a data reception request requesting reception of the read data to the host apparatus 10 (SP16).

Further, the I/O processor 23 transmits an update request requesting an update to the shared memory management table T1 to the shared memory 224 (CL1). Note that, in reality, the memory controller 221 receives the update request from the I/O processor 23 and the memory controller 221 updates the shared memory management table T1 by adding the newly managed address to the shared memory management table T1 by way of co-operation with the processor 222 (SP17).

Upon receipt of the data reception request from the I/O processor 23, the host apparatus 10 reads the read data from the cache memory 223 (CL1) (SP18), and ends the read processing.

Figure 11:
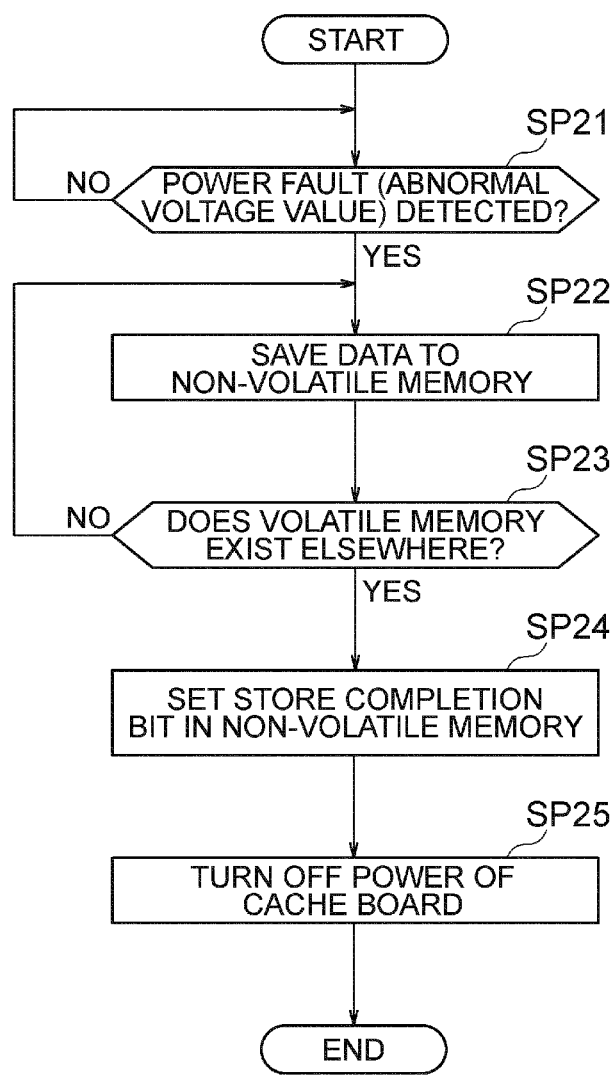
FIG. 11 is a flowchart showing data save processing.

FIG. 11 shows a processing routine for data save processing. The data save processing is executed when the processor 222 receives an abnormal voltage value from the voltage monitoring unit 226 as a monitoring result. Further, as a result of the data save processing, the cache data D1 which is stored in the cache memory 223 and the configuration information D11 and control information D12 which are stored in the shared memory 224 are saved to the non-volatile memory 225 as shown in FIG. 7.

The data save processing is executed by way of co-operation with the memory controller 221 and the processor 222. For the sake of convenience in the description, the processor 222 is described hereinbelow as the processing subject.

First, the processor 222 receives the monitoring result from the voltage monitoring unit 226 at regular intervals and determines whether the received monitoring result is an abnormal voltage value (SP21).

Upon obtaining a negative result in this determination, the processor 222 repeats the processing of step SP21 until the monitoring result is an abnormal voltage value. However, upon obtaining an affirmative result in this determination, the processor 222 saves the data which is stored in the cache memory 223 and the shared memory 224, which are volatile memory, in the non-volatile memory 225 by way of co-operation with the memory controller 221 (SP22).

The processor 222 then determines whether there is a volatile memory which is storing data which is to be saved elsewhere (SP23).

Upon obtaining an affirmative result in this determination, the processor 222 migrates to step SP22 and saves the data which is to be saved from the volatile memory to the non-volatile memory 225.

If, on the other hand, a negative result is obtained in the determination of step SP23, the processor 222 sets a store completion bit which indicates that data has been saved from the volatile memory to the non-volatile memory 225 to a preset value (SP24).

Note that the store completion bit may be saved in advance in the storage area of the non-volatile memory 225 or may be saved in advance in the storage area of another non-volatile memory used for the storage completion bit. The processor 222 sets the store completion bit at 1, for example, if data has been saved in the non-volatile memory 225 and sets the store completion bit at 0, for example, if data has been restored to volatile memory.

The processor 222 then turns the power of the cache board 22 to OFF (SP25), and then ends the data save processing.

Figure 12:
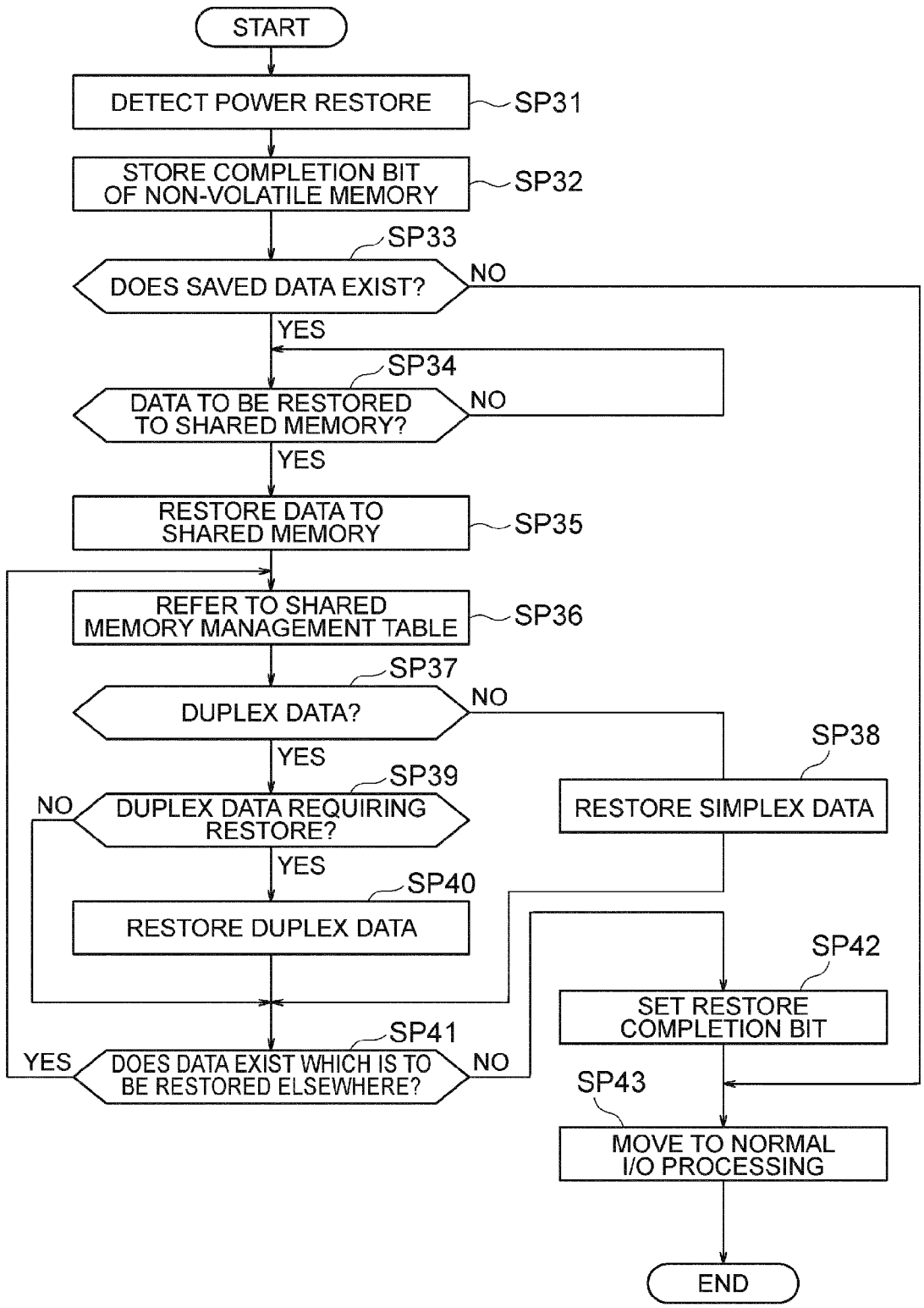
FIG. 12 is a flowchart showing data restore processing.

FIG. 12 shows the processing routine for data restore processing. Data restore processing is executed when the power of the disk subsystem 1 is restored. Further, as a result of this data restore processing, the configuration information D11 and the control information D12 which are stored in the non-volatile memory 225 are restored to the shared memory 224 and the cache data D1 is restored to the cache memory 223, as shown in FIG. 8.

This data restore processing is executed by way of co-operation with the memory controller 221 and the processor 222. For the sake of convenience in the description, the processor 222 is described hereinafter as the processing subject.

First, upon detecting that the power of the disk subsystem 1 has been restored (SP31), the processor 222 checks the store completion bit in the non-volatile memory 225 (SP32).

The processor 222 then determines whether or not there is data which has been saved to the non-volatile memory 225 on the basis of the value set for the store completion bit (SP33).

Upon obtaining a negative result in this determination, the processor 222 moves on to normal I/O processing in the absence of data which has been saved to the non-volatile memory 225 (SP43) and ends the data restore processing.

If, on the other hand, an affirmative result is obtained in the determination of step SP33, the processor 222 determines that there is data which has been saved to the non-volatile memory 225. Further, in order to restore data to the shared memory 224, the processor 222 first searches for data which is to be restored to the shared memory 224 among the data which has been saved to the non-volatile memory 225 (SP34).

Upon obtaining a negative result in this determination, the processor 222 then retrieves data which is to be restored to the shared memory 224 from the data which has been saved to the non-volatile memory 225.

If, on the other hand, an affirmative result is obtained in the determination of step SP35, the processor 222 restores data to the shared memory 224 (SP35).

Note that, here, the data which is restored to the shared memory 224 is, more specifically, configuration information D11 and the control information D12 and the control information D12 contains the shared memory management table T1.

The processor 222 subsequently refers to the shared memory management table T1 among the data which has been restored to the shared memory 224 (SP36) to determine whether the data which has been restored from the non-volatile memory 225 to the cache memory 223 is duplex data (SP37).

The processor 222 specifically performs the following processing in the determination of whether the data is duplex data. That is, if the processor 222 is the processor 222 (CL1), for example, the processor 222 (CL1) refers to the cache address CL1 field T12 and the cache address CL2 field T13 in the shared memory management table T1 (CL1) and determines that the data is duplex data if an address is stored in both fields. However, the processor 222 determines that the data is simplex data if an address is stored in only the cache address CL1 field T12.

Upon obtaining a negative result in the determination of step SP37, the processor 222 restores simplex data which has been stored in the non-volatile memory 225 to the cache memory 223 (SP38).

If, on the other hand, an affirmative result is obtained in the determination of step SP37, the processor 222 determines whether or not the duplex data stored in the non-volatile memory 225 is duplex data for which restoration is required (SP39).

More specifically, the processor 222 performs the following processing in the determination of whether the data is duplex data requiring restoration. That is, if, for example, the processor 222 is the processor 222 (CL1) and the processor 222 (CL1) determines beforehand that the duplex data requiring restoration is duplex data from the host apparatus 10 with the host address "AAA," the processor 222 (CL1) refers to the host address field T11 in the shared memory management table T1 (CL1) and determines that the duplex data with the cache address "XXX" is duplex data which is to be restored because the host address is "AAA". Note that, conversely, if the processor 222 (CL1) determines beforehand that the duplex data requiring restoration is not duplex data from the host apparatus 10 with the host address "AAA", the processor 222 (CL1) determines that the duplex data with the cache address "XXX" is not duplex data which is to be restored because the host address is "AAA" and does not restore the data. In this case, the processor 222 (CL2) performs restoration via the path P.

Upon obtaining an affirmative result in the determination of step SP39, the processor 222 restores the duplex data which is stored in the non-volatile memory 225 to the cache memory 223 (SP40).

If, on the other hand, a negative result is obtained in the determination of step SP39, the processor 222 moves to step SP41.

The processor 222 determines whether there is cache data D1 which is to be restored elsewhere in the non-volatile memory 225 (SP41).

Upon obtaining an affirmative result in this determination, the processor 222 moves to step SP36 and executes the aforementioned processing. If, on the other hand, a negative result is obtained in this determination, the processor 222 sets the restore completion bit to a preset value (SP42).

Note that the restore completion bit is saved beforehand by means of a registry which is not shown in the memory controller 221. The processor 222 sets the restore completion bit at 1, for example, if all the cache data D1 which have been saved in the non-volatile memory 225 is restored to the cache memory 223.

The processor 222 then moves to normal I/O processing (SP43) and ends the data restore processing.

(1-8) Effect of the First Embodiment

As described hereinabove, according to the disk subsystem 1 and data restoration method according to this embodiment, there exists an arrangement whereby, when the power of the disk subsystem 1 is shut off, the shared memory management table T1 is saved to the non-volatile memory 225 together with the cache data D1 and, when the power of the disk subsystem 1 is restored, the shared memory management table T1 is referenced and the duplex data is assigned to two non-volatile memories 225 and restored to each of the two cache memories 223, and hence the rise time when the disk subsystem 1 is restored can be shortened.

(2) Second Embodiment

The disk subsystem 1 according to a second embodiment differs from the disk subsystem 1 according to the first embodiment in that there is a difference between the cache addresses which are managed by the shared memory management table T1 (CL1) and the cache addresses which are managed by the shared memory management table T1 (CL0). Further, the disk subsystem 1 according to the second embodiment differs from the disk subsystem 1 according to the first embodiment in that, in the data restore processing, the shared memory management table T1 (CL1) and the shared memory management table T1 (CL2) are transferred and exchanged together. Configurations which are the same as in the first embodiment have been assigned the same reference signs and a description thereof is omitted, and different configurations are described.

(2-1) Table Configuration

Figure 13:
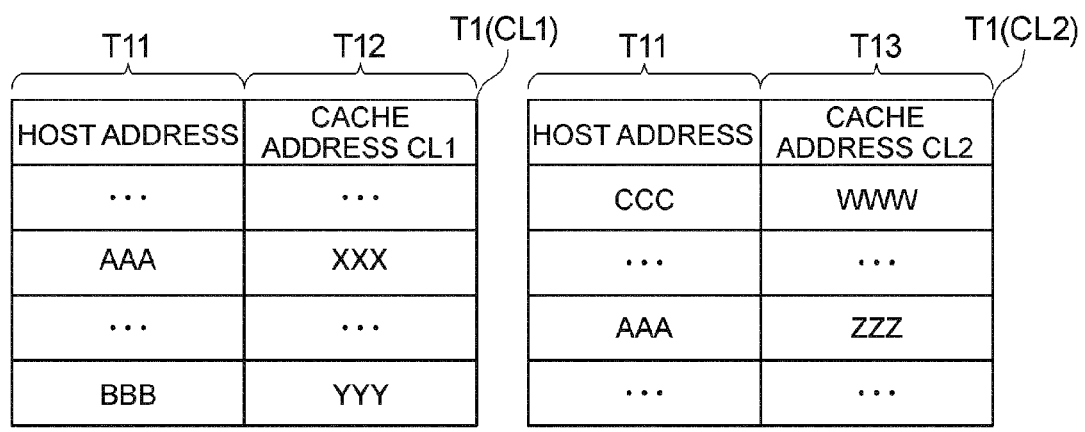
FIG. 13 is a conceptual diagram showing a second shared memory management table.

FIG. 13 shows a conceptual diagram of the shared memory management table T1 according to the second embodiment. The shared memory management table T1 (CL1) is a table which is held by the left cache board 22 (CL1) in FIG. 2 and the shared memory management table T1 (CL2) is a table which is held by the right cache board 22 (CL2) in FIG. 2.

The shared memory management table T1 is a table which is referenced when the cache data D1 is assigned and restored from the non-volatile memory 225 to the cache memory 223 when the disk subsystem 1 is restored. The shared memory management table T1 (CL1) is configured from the host address field T11 and the cache address CL1 field T12 and the shared memory management table T1 (CL2) is configured from the host address field T11 and the cache address CL2 field T13.

The host address field T11 stores address information of the host apparatus 10 as information for specifying the position of the host apparatus 10. Further, the cache address CL1 field T12 stores address information in the cache memory 223 (CL1) where the cache data D1 is stored (has been stored). Further, the cache address CL2 field T13 address information in the cache memory 223 (CL2) where the cache data D1 is stored (has been stored).

Therefore, in the case of FIG. 13, it can be seen that, for example, the write data from the host apparatus 10 with the host address "AAA" is duplexed and stored in the storage area with the address "XXX" in the cache memory 223 (CL1) and in the storage area with the address "ZZZ" in the cache memory 223 (CL2) respectively.

Note that, as illustrated, in the shared memory management table T1 (CL1) according to the second embodiment, for example, cache addresses in the cache memory 223 (CL1) are managed, but cache addresses in the cache memory 223 (CL2) are not managed. Similarly, in the shared memory management table T1 (CL2), cache addresses in the cache memory 223 (CL2) are managed, but cache addresses in the cache memory 223 (CL1) are not managed. The shared memory management table T1 according to the second embodiment differs from the shared memory management table T1 according to the first embodiment in that the shared memory management table T1 according to the second embodiment only manages the cache addresses of the cache data D1 stored in the cache memory 223 in the same cache board 22.

(2-2) Flowchart

Figure 14:
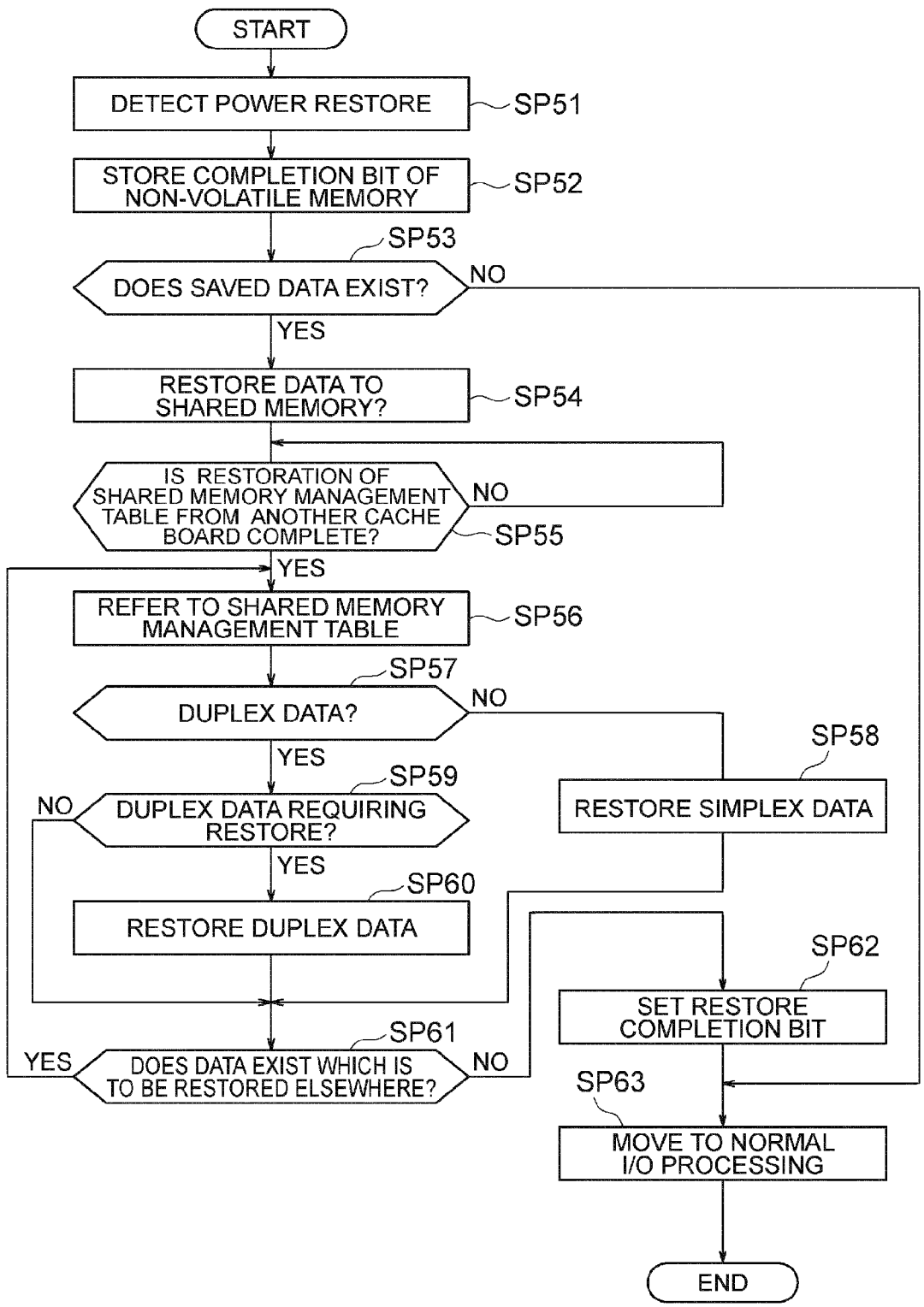
FIG. 14 is a flowchart showing second data restore processing.

FIG. 14 shows a processing routine for data restore processing according to the second embodiment. The data restore processing is executed when the power of the disk subsystem 1 is restored. Further, as a result of the data restore processing, the configuration information D11 and the control information D12 which are stored in the non-volatile memory 225 are restored to the shared memory 224 and the cache data D1 is restored to the cache memory 223, as shown in FIG. 8.

The data restore processing is executed by way of co-operation with the memory controller 221 and the processor 222. For the sake of convenience in the description, the processor 222 is described hereinafter as the processing subject.

The processing of steps SP51 to SP53 and the processing when a negative result is obtained in the determination of step SP53 are the same as the processing of steps SP31 to SP33 of the data restore processing (see FIG. 12) according to the first embodiment and the same as the processing when a negative result is obtained in the determination of step SP33 respectively, and hence a description thereof is omitted.

When an affirmative result is obtained in the determination of step SP53, the processor 222 determines that there is data which has been saved to the non-volatile memory 225. Further, the processor 222 first restores data to the shared memory 224, and retrieves data which is to be restored to the shared memory 224 among the data which has been saved to the non-volatile memory 225 in order to hold both the shared memory management tables T1, namely, the shared memory management table T1 (CL1) and the shared memory management table T1 (CL2) which are transferred together. Upon obtaining the data which is to be restored to the shared memory 224 as the retrieval result, the processor 222 restores the data to the shared memory 224 and transfers the shared memory management table T1 to the other cache board 22 (SP54).

Note that the specific processing of step SP54 is as follows. That is, if the processor 222 is processor 222 (CL1), for example, the processor 222 (CL1) first restores the shared memory management table T1 (CL1), which has been saved to the non-volatile memory 225 in the same cache board 22 (CL1), to the shared memory 224 (CL1). At the same time, the processor 222 (CL1) transfers the shared memory management table T1 (CL1) to the other cache board 22 (CL2) via the path P. Further, the processor 222 (CL1) receives the other shared memory management table T1 (CL2) which has been transferred from the other cache board 22 (CL2) via the path P.

The processor 222 then determines whether restoration of the other shared memory management table T1 which has been transferred from the other cache board 22 is complete (SP55).

Upon obtaining a negative result in this determination, the processor 222 waits until restoration of the shared memory management table T1 which has been transferred from the other cache board 22 is complete.

If, on the other hand, an affirmative result is obtained in the determination of step SP55, the processor 222 refers to the shared memory management table T1 (CL1, for example) which has been restored from the non-volatile memory 225 on the same cache board 22 and to the shared memory management table T1 (CL2, for example) which has been transferred and restored from the non-volatile memory 225 of the other cache board 22 (SP56), and determines whether the data which is restored from the non-volatile memory 225 to the cache memory 223 is duplex data (SP57).

The processing of steps SP58 to SP63 is the same as the processing of steps SP38 to SP43 of the data restore processing (see FIG. 12) according to the first embodiment and hence a description thereof is omitted here.

(2-3) Effect of the Second Embodiment

As described hereinabove, with the disk subsystem 1 and data restoration method according to this embodiment, the shared memory management tables T1 are each tables for managing only cache addresses of the cache data D1 which is stored in the cache memory 223 on the same cache board 22, and therefore the shared memory management tables T1 are transferred and exchanged together in the data restore processing, and hence, normally, when the power is not shut off, there is no need to manage the two corresponding cache addresses in the cache memory 223, thus making management straightforward.

(3) Third Embodiment

The disk subsystem 1 according to the third embodiment differs from the disk subsystem 1 according to the first embodiment in that the disk subsystem 1 according to the third embodiment executes data restore processing on the basis of a conflict avoidance rule table T2 (see FIG. 15). Configurations which are the same as in the first embodiment have been assigned the same reference signs and a description thereof is omitted, and different configurations are described.

(3-1) Table Configuration

FIG. 15 shows a conceptual diagram of the conflict avoidance rule table T2. The conflict avoidance rule table T2 (CL1) is a table which is held by the left cache board 22 (CL1) in FIG. 2 and the conflict avoidance rule table T2 (CL2) is a table which is held by the left cache board 22 (CL2) in FIG. 2. The conflict avoidance rule table T2 is stored in the shared memory 224, for example.

The conflict avoidance rule table T2 is a table which is referenced when the cache data D1 is assigned and restored from the non-volatile memory 225 to the cache memory 223 when the disk subsystem 1 is restored. The conflict avoidance rule table T2 is configured from CL1 field T21, CL2 field T22, and order field T23.

The CL1 field T21 stores identification information for the memory comprising the cache memory 223 (CL1). The CL2 field T22 stores identification information for the memory comprising the cache memory 223 (CL2). The order field T23 stores a preset order.

Therefore, in the case of FIG. 15, for example, it can be seen that if the data which has been saved to the non-volatile memory 225 (CL1) is restored to the cache memory 223 (CL1) and the cache memory (CL2), the data is first "1" restored to a "memory00" of the cache memory 223 (CL1) and the "memory10" of the cache memory 223 (CL2), and then "2" data is restored to the "memory00" of the cache memory (CL1) and the "memory11" of the cache memory 223 (CL2). It can also be seen that if the data which has been saved to the non-volatile memory 225 (CL2) is restored to the cache memory 223 (CL2) and the cache memory 223 (CL1), data is first "1" restored to the "memory01" of the cache memory 223 (CL1) and the "memory11" of the cache memory 223 (CL2) and then "2" data is restored to the "memory01" of the cache memory 223 (CL1) and the "memory10" of the cache memory 223 (CL2).

(3-2) Restore Image

Figure 16:
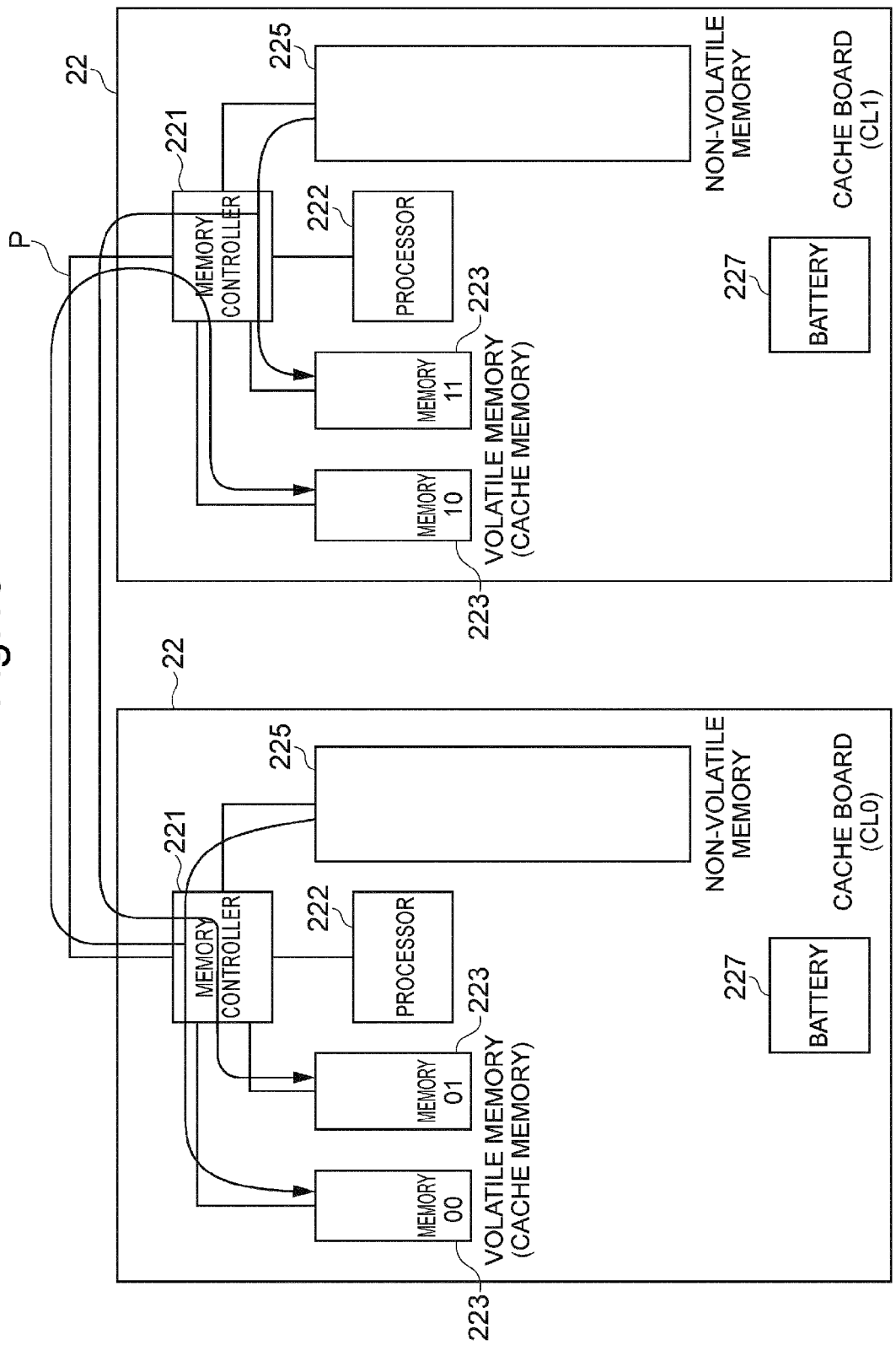
FIG. 16 is a conceptual diagram showing a restore image during a third power restore.

FIG. 16 shows a restore image when the power is restored. If the power of the disk subsystem 1 is restored, the memory controller 221 refers to the conflict avoidance rule table T2 and restores duplex data, among the cache data D1 which has been saved to the non-volatile memory 225, to the memory00 to memory11 which comprise the cache memory 223 which is a volatile memory, by way of co-operation with the processor 222.

The restore image shown in FIG. 16 is an image for a restore which is performed on the basis of the order ranking "1" of the conflict avoidance rule table T2 shown in FIG. 15. When the order ranking "1" of the conflict avoidance rule table T2 is referenced, the data which has been saved to the non-volatile memory 225 (CL1) is restored to the "memory00" of the cache memory 223 (CL1) and the "memory10" of the cache memory 223 (CL2). Further, the data which has been saved to the non-volatile memory 225 (CL2) is restored to the "memory11" of the cache memory 223 (CL2) and the "memory01" of the cache memory 223 (CL1).

(3-3) Flowchart

Figure 17:
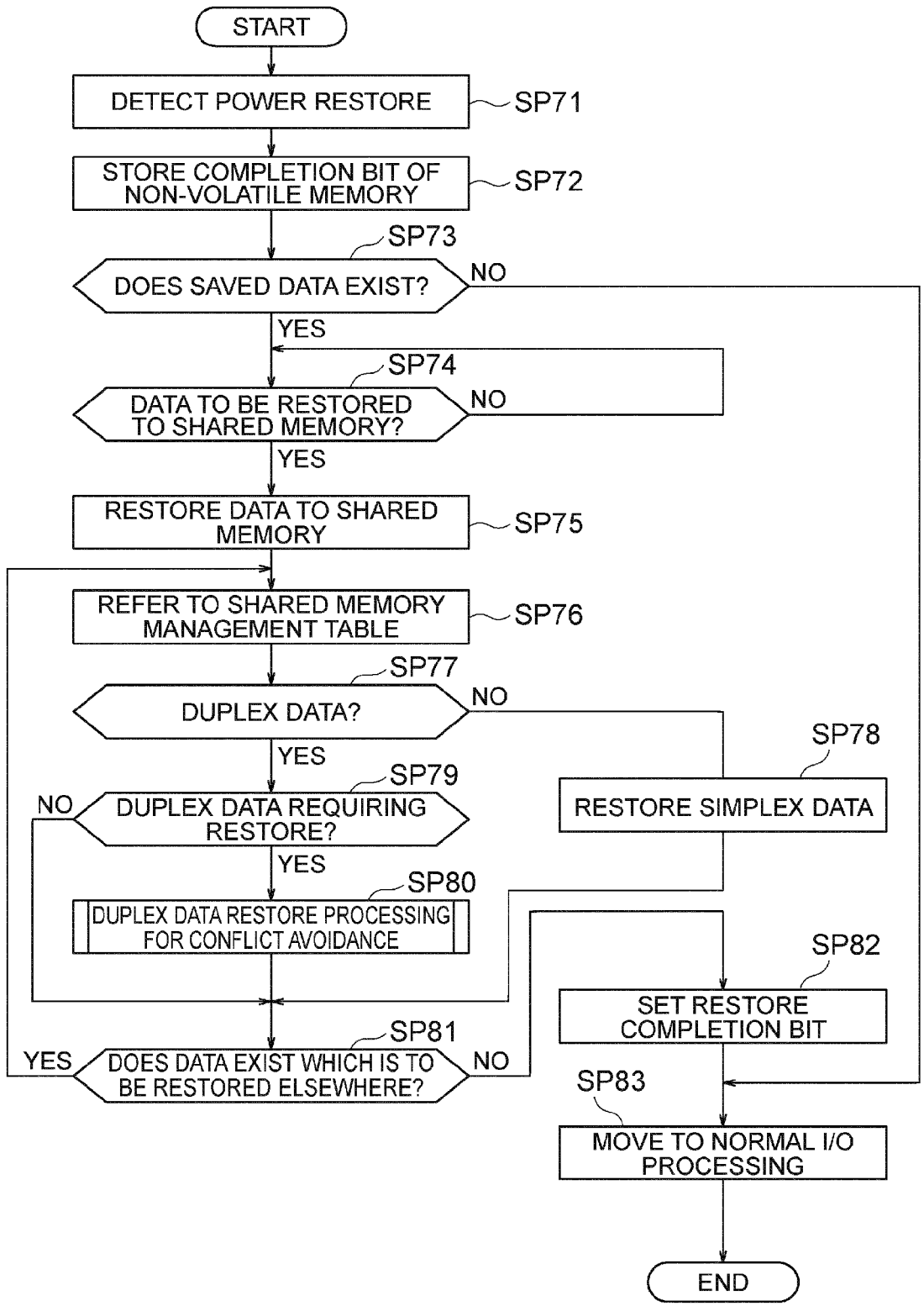
FIG. 17 is a flowchart showing third data restore processing.

FIG. 17 shows a processing routine for data restore processing. The data restore processing is executed when the power of the disk subsystem 1 is restored. Further, as a result of the data restore processing, the configuration information D11 and the control information D12 which are stored in the non-volatile memory 225 is restored to the shared memory 224 as shown in FIG. 16, and the cache data D1 is restored to any of the "memory00" to "memory11" of the cache memory 223.

The data restore processing is executed by way of co-operation with the memory controller 221 and the processor 222. For the sake of convenience in the description, the processor 222 is described hereinbelow as the processing subject.

The processing of steps SP71 to SP79 and the processing when a negative result is obtained in the determination of step SP79 are the same as the processing of steps SP31 to SP39 of the data restore processing (see FIG. 12) according to the first embodiment and the processing when a negative result is obtained in the determination of step SP39, and hence a description is omitted here.

When an affirmative result is obtained in the determination of step SP79, the processor 222 executes duplex data restore processing for conflict avoidance (SP80).

Duplex data restore processing for conflict avoidance of this step SP80 will be described subsequently (see FIG. 18).

The processing of steps SP81 to SP83 is the same as the processing of steps SP41 to SP43 of the data restore processing according to the first embodiment (see FIG. 12), and therefore a description thereof is omitted here.

Figure 18:
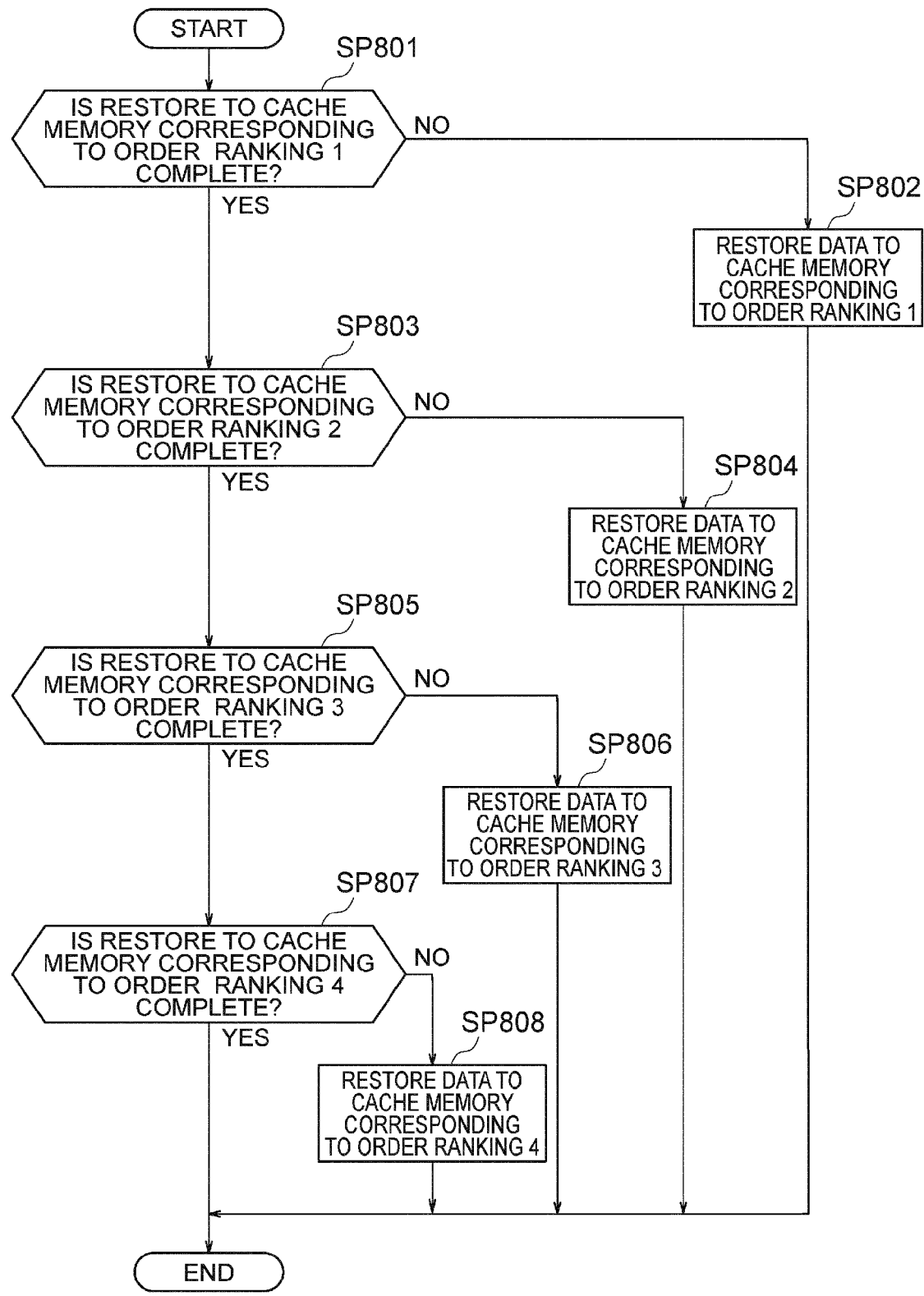
FIG. 18 is a flowchart showing duplex data restore processing for conflict avoidance.

FIG. 18 shows a processing routine for duplex data restore processing for conflict avoidance. The processor 222 first refers to the conflict avoidance rule table T2 and determines whether the duplex data restore is complete for the cache memory 223 corresponding to the order ranking 1 (SP801).

For example, if the processor 222 is the processor 222 (CL1), the processor 222 (CL1) refers to the conflict avoidance rule table T2 (CL1) and determines whether the duplex data restore is complete for the memory00 and the memory10 corresponding to the order ranking 1.

When a negative result is obtained in this determination, the processor 222 restores duplex data to the cache memory 223 which corresponds to the order ranking 1 (SP802) and ends the processing.

If, on the other hand, an affirmative result is obtained in the determination of step SP801, the processor 222 then determines whether the duplex data restore is complete for the cache memory 223 corresponding to the order ranking 2 (SP803).

When a negative result is obtained in the determination, the processor 222 restores duplex data to the cache memory 223 corresponding to the order ranking 2 (SP804) and ends the processing.

If, on the other hand, an affirmative result is obtained in the determination of step SP803, the processor 222 then determines whether the duplex data restore is complete for the cache memory 223 corresponding to the order ranking 3 (SP805).

When a negative result is obtained in this determination, the processor 222 restores the duplex data to the cache memory 223 corresponding to the order ranking 3 (SP806), and ends the processing.

If, on the other hand, an affirmative result is obtained in the determination of step SP805, the processor 222 then determines whether the duplex data restore is complete for the cache memory 223 corresponding to the order ranking 4 (SP807).

When a negative result is obtained in the determination, the processor 222 restores the duplex data to the cache memory 223 corresponding to the order ranking 4 (SP808), and ends the processing.

If, on the other hand, an affirmative result is obtained in the determination of step SP807, the processor 222 determines that the duplex data restore is complete for all the cache memories 223, and ends the processing.

(3-4) Effect of the Third Embodiment

As described earlier, with the disk subsystem 1 and the data restoration method according to this embodiment, when the data which has been saved to the non-volatile memory 225 is restored to the cache memory 223, the data is restored on the basis of the conflict avoidance rule table T2, and hence the restore can be performed so as to prevent a conflict between restore destinations and waiting for a data restore can be avoided, and hence the rise time when the disk subsystem 1 is restored can be shortened further.

(4) Further Embodiments

Note that, although a case was described in the foregoing first embodiment in which, as shown in FIG. 1, the disk controller 20 is configured comprising two channel adapters 21, two cache boards 22, two I/O processors 23, and two disk adapters, the present invention is not limited to such a configuration, rather, the disk controller 20 may be configured comprising, for example, a plurality of channel adapters 21, a plurality of cache boards 22, a plurality of I/O processors 23, and a plurality of disk adapters. In this case, a plurality of non-volatile memories 225 can be assigned in the data restore processing and the cache data D1 can be restored to the cache memory 223, and the rise time of the disk subsystem 1 at the time of restoration can be shortened.

Further, although a case was described in the foregoing first embodiment in which, as shown in FIG. 2, the cache board 22 is configured comprising one non-volatile memory 225, the present invention is not limited to such a configuration, rather, the cache board 22 may also be configured comprising one other non-volatile memory which is different from the non-volatile memory 225, for example. In this case, the non-volatile memory 225 is able to store the configuration information D11, the control information D12, and the cache data D1 as described earlier, while the other non-volatile memory is able to hold store completion bit settings and, as a result of the functions being assigned in this way, the rise time when the disk subsystem 1 is restored can be shortened further.

REFERENCE SIGNS LIST

1 Disk subsystem
10 Host apparatus
20 Disk controller
21 Channel adapter
22 Cache board
221 Memory controller
222 Processor
223 Cache memory
224 Shared memory
225 Non-volatile memory
226 Voltage monitoring unit
227 Battery
30 Storage apparatus
31 Storage device

The invention claimed is:

1. A disk subsystem, comprising:
a first cache board which comprises a first memory controller connected to a first volatile memory, a first shared memory, and a first non-volatile memory, respectively, a first processor which is connected to the first memory controller, and a first battery which temporarily supplies power when power is shut off;
a second cache board which comprises a second memory controller connected to a second volatile memory, a second shared memory, and a second non-volatile memory, respectively, a second processor which is connected to the second memory controller, and a second battery which temporarily supplies power when power is shut off; and
a transmission channel which communicably connects the first cache board and the second cache board,
wherein, if power which is supplied to the first cache board is shut off, the first processor saves data which is stored in the first volatile memory to the first non-volatile memory and saves first management information for managing data which is stored in the first shared memory to the first non-volatile memory, by way of co-operation with the first memory controller while power is being supplied from the first battery, wherein, if power which is supplied to the first cache board is restored, the first processor restores first data among data which has been saved to the first non-volatile memory and second data which has been transferred via the transmission channel, to the first shared memory, on the basis of the first management information and transfers the first data to the second cache board via the transmission channel, by way of co-operation with the first memory controller, wherein, if power which is supplied to the second cache board is shut off, the second processor saves data which is stored in the second volatile memory to the second non-volatile memory and saves second management information for managing data which is stored in the second shared memory to the second non-volatile memory, by way of co-operation with the second memory controller while power is being supplied from the second battery, wherein, if power which is supplied to the second cache board is restored, the second processor restores the second data among data which has been saved to the second non-volatile memory and the first data which has been transferred via the transmission channel, to the second shared memory, on the basis of the second management information and transfers the second data to the first cache board via the transmission channel, by way of co-operation with the second memory controller, wherein the first processor determines, based on a predetermined conflict avoidance rule, whether data restoration is complete corresponding to a first order ranking, and on a condition that data restoration is not complete corresponding to the first order ranking, the first processor restores data corresponding to the first order ranking, and on a condition that the data restoration is complete corresponding to the first order ranking, the first processor determines, based on the predetermined avoidance rule, whether data restoration is complete corresponding to a second order ranking, and on a condition that data restoration is not complete corresponding to the second order ranking, the first processor restores data corresponding to the second order ranking, and on a condition that the data restoration is complete corresponding to the second order ranking, the first processor determines, based on the predetermined avoidance rule, whether data restoration is complete corresponding to a third order ranking, and on a condition that the data restoration is not complete corresponding to the third order ranking, the first processor restores data corresponding to the third order ranking, and on a condition that the data restoration is complete corresponding to the third order ranking, the first processor determines, based on the predetermined conflict avoidance rule, whether data restoration is complete corresponding to a fourth order ranking, and on a condition that data restoration is not complete corresponding to the fourth order ranking, the first processor restores data corresponding to the fourth order ranking, and on a condition that the data restoration is complete corresponding to the fourth order ranking, the fourth processor ends processing.

2. The disk subsystem according to claim 1,
wherein the first data is part of duplex data which is saved in the first non-volatile memory and the second non-volatile memory, and wherein the second data is data other than the first data among duplex data which is saved in the first non-volatile memory and the second non-volatile memory.

3. The disk subsystem according to claim 1,
wherein, if power which is supplied to the first cache board is restored, the first processor restores simplex data which has not been saved to the second non-volatile memory among the data which has been saved to the first non-volatile memory from the first non-volatile memory to the first volatile memory on the basis of the first management information by way of co-operation with the first memory controller and, wherein, if the power which is supplied to the second cache board is restored, the second processor restores simplex data which has not been saved to the first non-volatile memory among the data which has been saved to the second non-volatile memory from the second non-volatile memory to the second volatile memory on the basis of the second management information by way of co-operation with the second memory controller.

4. The disk subsystem according to claim 1,
wherein the first management information is information which associates address information of a host apparatus which is connected to the disk subsystem, address information in the first volatile memory, and address information in the second volatile memory, and wherein the second management information is information which associates address information of a host apparatus which is connected to the disk subsystem, address information in the first volatile memory, and address information in the second volatile memory.

5. The disk subsystem according to claim 1, wherein the first management information is information for managing only data which is stored in the first volatile memory.

6. The disk subsystem according to claim 1,
the first data and the second data on the basis of the first management information and predetermined restore rules and transfers the first data to the second cache board and the first data on the basis of the second management information and predetermined restore rules and transfers the second data to the first cache board.

7. The disk subsystem according to claim 6,
wherein the predetermined restore rules are rules for predetermining the order rankings of restore destinations so that there is no restore destination conflict between data which has been restored from the first non-volatile memory to the first volatile memory and the second volatile memory, and data which has been restored from the second non-volatile memory to the first volatile memory and the second volatile memory.

8. A data restoration method for a disk subsystem,
wherein the disk subsystem comprises a first cache board which comprises a first memory controller connected to a first volatile memory, a first shared memory, and a first non-volatile memory, respectively, a first processor which is connected to the first memory controller, and a first battery which temporarily supplies power when power is shut off;

a second cache board which comprises a second memory controller connected to a second volatile memory, a second shared memory, and a second non-volatile memory, respectively, a second processor which is connected to the second memory controller, and a second battery which temporarily supplies power when power is shut off; and a transmission channel which communicably connects the first cache board and the second cache board, the data restoration method comprising:

a first step in which, if power which is supplied to the first cache board is shut off, the first processor saves data which is stored in the first volatile memory to the first non-volatile memory and saves first management information for managing data which is stored in the first shared memory to the first non-volatile memory, by way of co-operation with the first memory controller while power is being supplied from the first battery;

a second step in which, if power which is supplied to the first cache board is restored, the first processor restores first data among data which has been saved to the first non-volatile memory and second data which has been transferred via the transmission channel, to the first shared memory, on the basis of the first management information and transfers the first data to the second cache board via the transmission channel, by way of co-operation with the first memory controller;

a third step in which, if power which is supplied to the second cache board is shut off, the second processor saves data which is stored in the second volatile memory to the second non-volatile memory and saves second management information for managing data which is stored in the second shared memory to the second non-volatile memory, by way of co-operation with the second memory controller while power is being supplied from the second battery;

a fourth step in which, if power which is supplied to the second cache board is restored, the second processor restores the second data among data which has been saved to the second non-volatile memory and the first data which has been transferred via the transmission channel to the second shared memory on the basis of the second management information and transfers the second data to the first cache board via the transmission channel, by way of co-operation with the second memory controller; and a fifth step in which the first processor determines, based on a predetermined conflict avoidance rule, whether data restoration is complete corresponding to a first order ranking, and on a condition that data restoration is not complete corresponding to the first order ranking, the first processor restores data corresponding to the first order ranking, and on a condition that the data restoration is complete corresponding to the first order ranking, the first processor determines, based on the predetermined avoidance rule, whether data restoration is complete corresponding to a second order ranking, and on a condition that data restoration is not complete corresponding to the second order ranking, the first processor restores data corresponding to the second order ranking, and on a condition that the data restoration is complete corresponding to the second order ranking, the first processor determines, based on the predetermined avoidance rule, whether data restoration is complete corresponding to a third order ranking, and on a condition that the data restoration is not complete corresponding to the third order ranking, the first processor restores data corresponding to the third order ranking, and on a condition that the data restoration is complete corresponding to the third order ranking, the first processor determines, based on the predetermined conflict avoidance rule, whether data restoration is complete corresponding to a fourth order ranking, and on a condition that data restoration is not complete corresponding to the fourth order ranking, the first processor restores data corresponding to the fourth order ranking, and on a condition that the data restoration is complete corresponding to the fourth order ranking, the fourth processor ends processing.

9. The data restoration method according to claim 8,
wherein the first data is part of duplex data which is saved in the first non-volatile memory and the second non-volatile memory, and
wherein the second data is data other than the first data among duplex data which is saved in the first non-volatile memory and the second non-volatile memory.

10. The data restoration method according to claim 8,
wherein, in the second step,
if power which is supplied to the first cache board is restored, the first processor restores simplex data which has not been saved to the second non-volatile memory among the data which has been saved to the first non-volatile memory from the first non-volatile memory to the first volatile memory on the basis of the first management information by way of co-operation with the first memory controller and,
wherein, in the fourth step,
if the power which is supplied to the second cache board is restored, the second processor restores simplex data which has not been saved to the first non-volatile memory among the data which has been saved to the second non-volatile memory from the second non-volatile memory to the second volatile memory on the basis of the second management information by way of co-operation with the second memory controller.

11. The data restoration method according to claim 8,
wherein the first management information is information which associates address information of a host apparatus which is connected to the disk subsystem, address information in the first volatile memory, and address information in the second volatile memory, and
wherein the second management information is information which associates address information of a host apparatus which is connected to the disk subsystem, address information in the first volatile memory, and address information in the second volatile memory.

12. A data restoration method for a disk subsystem, wherein the disk subsystem comprises:
a first cache board which comprises a first memory controller connected to a first volatile memory, a first shared memory, and a first non-volatile memory, respectively, a first processor which is connected to the first memory controller, and a first battery which temporarily supplies power when power is shut off;
a second cache board which comprises a second memory controller connected to a second volatile memory, a second shared memory, and a second non-volatile memory, respectively, a second processor which is connected to the second memory controller, and a second battery which temporarily supplies power when power is shut off; and
a transmission channel which communicably connects the first cache board and the second cache board,
the data restoration method comprising:
a first step in which, if power which is supplied to the first cache board is shut off, the first processor saves data which is stored in the first volatile memory to the first non-volatile memory and saves first management information for managing data which is stored in the first shared memory to the first non-volatile memory, by way of co-operation with the first memory controller while power is being supplied from the first battery;

a second step in which, if power which is supplied to the first cache board is restored, the first processor acquires second management information for managing data which is stored in the second volatile memory via the transmission channel, restores first data among data which has been saved to the first non-volatile memory and second data which has been transferred via the transmission channel on the basis of the acquired second management information and the first management information and transfers the first data to the second cache board via the transmission channel, by way of co-operation with the first memory controller;

a third step in which, if power which is supplied to the second cache board is shut off, the second processor saves data which is stored in the second volatile memory to the second non-volatile memory and saves the second management information to the second non-volatile memory, by way of co-operation with the second memory controller while power is being supplied from the second battery;

a fourth step in which, if power which is supplied to the second cache board is restored, the second processor acquires the first management information via the transmission channel, restores the second data among data which has been saved to the second non-volatile memory and the first data which has been transferred via the transmission channel on the basis of the acquired first management information and the second management information and transfers the second data to the first cache board via the transmission channel, by way of co-operation with the second memory controller; and a fifth step in which the first processor determines, based on a predetermined conflict avoidance rule, whether data restoration is complete corresponding to a first order ranking, and on a condition that data restoration is not complete corresponding to the first order ranking, the first processor restores data corresponding to the first order ranking, and on a condition that the data restoration is complete corresponding to the first order ranking, the first processor determines, based on the predetermined avoidance rule, whether data restoration is complete corresponding to a second order ranking, and on a condition that data restoration is not complete corresponding to the second order ranking, the first processor restores data corresponding to the second order ranking, and on a condition that the data restoration is complete corresponding to the second order ranking, the first processor determines, based on the predetermined avoidance rule, whether data restoration is complete corresponding to a third order ranking, and on a condition that the data restoration is not complete corresponding to the third order ranking, the first processor restores data corresponding to the third order ranking, and on a condition that the data restoration is complete corresponding to the third order ranking, the first processor determines, based on the predetermined conflict avoidance rule, whether data restoration is complete corresponding to a fourth order ranking, and on a condition that data restoration is not complete corresponding to the fourth order ranking, the first processor restores data corresponding to the fourth order ranking, and on a condition that the data restoration is complete corresponding to the fourth order ranking, the fourth processor ends processing.

13. The data restoration method for a disk subsystem, wherein the disk subsystem comprises:

a first cache board which comprises a first memory controller connected to a first volatile memory, a first shared memory, and a first non-volatile memory, respectively, a first processor which is connected to the first memory controller, and a first battery which temporarily supplies power when power is shut off;

a second cache board which comprises a second memory controller connected to a second volatile memory, a second shared memory, and a second non-volatile memory, respectively, a second processor which is connected to the second memory controller, and a second battery which temporarily supplies power when power is shut off; and a transmission channel which communicably connects the first cache board and the second cache board, the data restoration method comprising:

a first step in which, if power which is supplied to the first cache board is shut off, the first processor saves data which is stored in the first volatile memory to the first non-volatile memory and saves first management information for managing data which is stored in the first shared memory to the first non-volatile memory, by way of co-operation with the first memory controller while power is being supplied from the first battery;

a second step in which, if power which is supplied to the first cache board is restored, the first processor restores first data among data which has been saved to the first non-volatile memory and second data which has been transferred via the transmission channel to the first volatile memory on the basis of the first management information and predetermined restore rules, and transfers the first data to the second cache board via the transmission channel, by way of co-operation with the first memory controller;

a third step in which, if power which is supplied to the second cache board is shut off, the second processor saves data which is stored in the second volatile memory to the second non-volatile memory and saves the second management information for managing data which is stored in the second shared memory to the second non-volatile memory, by way of co-operation with the second memory controller while power is being supplied from the second battery;

a fourth step in which, if power which is supplied to the second cache board is restored, the second processor restores the second data among data which has been saved to the second non-volatile memory and the first data which has been transferred via the transmission channel to the second volatile memory on the basis of the second management information and predetermined restore rules, and transfers the second data to the first cache board via the transmission channel, by way of co-operation with the second memory controller, and a fifth step in which the first processor determines, based on a predetermined conflict avoidance rule, whether data restoration is complete corresponding to a first order ranking, and on a condition that data restoration is not complete corresponding to the first order ranking, the first processor restores data corresponding to the first order ranking, and on a condition that the data restoration is complete corresponding to the first order ranking, the first processor determines, based on the predetermined avoidance rule, whether data restoration is complete corresponding to a second order ranking, and on a condition that data restoration is not complete corresponding to the second order ranking, the first processor restores data corresponding to the second order ranking, and on a condition that the data restoration is complete corresponding to the second order ranking, the first processor determines, based on the predetermined avoidance rule, whether data restoration is complete corresponding to a third order ranking, and on a condition that the data restoration is not complete corresponding to the third order ranking, the first processor restores data corresponding to the third order ranking, and on a condition that the data restoration is complete corresponding to the third order ranking, the first processor determines, based on the predetermined conflict avoidance rule, whether data restoration is complete corresponding to a fourth order ranking, and on a condition that data restoration is not complete corresponding to the fourth order ranking, the first processor restores data corresponding to the fourth order ranking, and on a condition that the data restoration is complete corresponding to the fourth order ranking, the fourth processor ends processing.

14. The data restoration method according to claim 13, wherein the predetermined restore rules are rules for predetermining the order rankings of restore destinations so that there is no restore destination conflict between data which has been restored from the first non-volatile memory to the first volatile memory and the second volatile memory, and data which has been restored from the second non-volatile memory to the first volatile memory and the second volatile memory.

* * * * *